United States Patent
Gaur et al.

(10) Patent No.: US 12,126,721 B2
(45) Date of Patent: Oct. 22, 2024

(54) REPUTATION PROFILE PROPAGATION ON BLOCKCHAIN NETWORKS

(71) Applicant: International Business Machines Corporation, Armonk, NY (US)

(72) Inventors: Nitin Gaur, Round Rock, TX (US); Elezaveta Koumpan, Ontario (CA); Marshall Allen Lamb, Raleigh, NC (US); Scott Gerard, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 65 days.

(21) Appl. No.: 17/215,102

(22) Filed: Mar. 29, 2021

(65) Prior Publication Data

US 2022/0311611 A1    Sep. 29, 2022

(51) Int. Cl.
*H04L 29/06* (2006.01)
*H04L 9/08* (2006.01)
*H04L 9/32* (2006.01)
*H04L 9/00* (2022.01)

(52) U.S. Cl.
CPC .......... *H04L 9/3213* (2013.01); *H04L 9/0847* (2013.01); *H04L 9/3297* (2013.01); *H04L 9/50* (2022.05); *H04L 2209/56* (2013.01)

(58) Field of Classification Search
None
See application file for complete search history.

(56) References Cited

U.S. PATENT DOCUMENTS

| | | | | |
|---|---|---|---|---|
| 8,112,412 B1 * | 2/2012 | Nachenberg | ............ | G06F 21/51 707/731 |
| 8,374,973 B2 * | 2/2013 | Herbrich | ................ | G06Q 30/02 705/347 |
| 8,781,984 B2 * | 7/2014 | Schreiner | ............... | G06Q 30/02 705/347 |
| 8,856,725 B1 * | 10/2014 | Anderson | ................. | G06F 8/75 717/103 |

(Continued)

FOREIGN PATENT DOCUMENTS

| | | |
|---|---|---|
| CN | 109284627 A | 1/2019 |
| EP | 3633964 A1 | 8/2020 |

(Continued)

OTHER PUBLICATIONS

Lee, "A Decentralized Reputation System: How Blockchain Can Restore Trust In Online Markets," Forbes, Aug. 13, 2018, 5 pages, https://www.forbes.com/sites/shermanlee/2018/08/13/a-decentralized-reputation-system-how-blockchain-can-restore-trust-in-online-markets/?sh=2c44dda4481a.

(Continued)

*Primary Examiner* — Shin-Hon (Eric) Chen
*Assistant Examiner* — Hassan A Hussein
(74) *Attorney, Agent, or Firm* — Jared C. Chaney

(57) ABSTRACT

A node in a blockchain network may initiate a non-fungible token identity, establish a profile for the non-fungible token identity, receive reputation data related to the non-fungible token identity, determine, based on the reputation data, a reputation score, append the non-fungible token identity with the reputation score as a non-fungible token metadata tag, and upload the non-fungible token identity and the metadata tag to an ID repository.

14 Claims, 12 Drawing Sheets

(56) References Cited

U.S. PATENT DOCUMENTS

| | | | |
|---|---|---|---|
| 9,363,283 B1* | 6/2016 | Herrera-Yagüe | G06F 21/57 |
| 2012/0072268 A1* | 3/2012 | Ritter | G06Q 10/06 |
| | | | 705/7.39 |
| 2015/0302400 A1* | 10/2015 | Metral | G06Q 40/12 |
| | | | 705/75 |
| 2016/0148206 A1* | 5/2016 | Van | G06Q 30/06 |
| | | | 705/44 |
| 2017/0140394 A1* | 5/2017 | Cao | G06Q 30/0201 |
| 2018/0165476 A1* | 6/2018 | Carey | H04L 9/3247 |
| 2018/0285979 A1* | 10/2018 | Chessell | G06Q 40/08 |
| 2018/0374151 A1* | 12/2018 | Joshi | G06Q 40/00 |
| 2019/0052722 A1* | 2/2019 | Gasking | H04L 67/306 |
| 2019/0222567 A1* | 7/2019 | Caldera | H04L 63/0876 |
| 2020/0036515 A1* | 1/2020 | Chari | H04L 9/3239 |
| 2020/0142986 A1* | 5/2020 | Ragnoli | H04L 63/12 |
| 2020/0160289 A1* | 5/2020 | Mahajan | G06Q 20/02 |
| 2020/0242105 A1* | 7/2020 | Rich | H04L 67/02 |
| 2020/0265435 A1* | 8/2020 | Bankston | H04L 9/006 |
| 2020/0311721 A1* | 10/2020 | Ow | G06Q 20/02 |
| 2020/0334685 A1* | 10/2020 | Yan | G06Q 20/4016 |
| 2021/0012332 A1* | 1/2021 | Ow | G06Q 20/3678 |
| 2021/0027404 A1* | 1/2021 | de Bold | G06Q 50/18 |
| 2021/0082044 A1* | 3/2021 | Sliwka | H04L 9/3255 |
| 2021/0350343 A1* | 11/2021 | Gaur | G06Q 20/027 |
| 2021/0350458 A1* | 11/2021 | Gaur | G06Q 40/02 |
| 2021/0390549 A1* | 12/2021 | Rule | G06Q 20/4016 |
| 2022/0131844 A1* | 4/2022 | Sherlock | H04L 63/105 |
| 2022/0351195 A1* | 11/2022 | Quigley | H04L 9/50 |

FOREIGN PATENT DOCUMENTS

| | | |
|---|---|---|
| KR | 102131292 B1 | 7/2020 |
| KR | 102156332 B1 | 9/2020 |
| WO | 2020122292 A1 | 6/2020 |

OTHER PUBLICATIONS

Huang et al., "RepChain: A Reputation-based Secure, Fast and High Incentive Blockchain System via Sharding," arXiv:1901.05741v2, Feb. 7, 2020, 12 pages, https://arxiv.org/pdf/1901.05741.pdf.

De Oliveira et al., "Blockchain reputation-based consensus: A scalable and resilient mechanism for distributed mistrusting applications," Elsevier, Computer Networks, vol. 179, Oct. 9, 2020, 17 pages, https://www.sciencedirect.com/science/article/pii/S1389128620300360.

Dennis et al., "Rep on the block: A next generation reputation system based on the blockchain," ResearchGate, 2015 10th International Conference for Internet Technology and Secured Transactions (ICITST), Dec. 2015, 20 pages, (Abstract Only) DOI: 10.1109/ICITST.2015.7412073, https://www.researchgate.net/publication/304410526_Rep_on_the_block_A_next_generation_reputation_system_based_on_the_blockchain.

* cited by examiner $Block_i$

Header $472_i$

- Hash Value of Previous Block
- Reference Information

File(s) (and Metadata) $474_i$

| Data 1 | REF 1 | Metadata 1 |
| Data 2 | REF 2 | Metadata 2 |
| . | . | . |
| . | . | . |
| . | . | . |
| . | . | . |
| . | . | . |
| Data N | REF N | Metadata N |

Value $476_i$ (based on one or more of)

- New Hash Value of File
- New Storage Location of File
- New Metadata Assigned to File
- Transfer Access/Control to New Blockchain Participant
- New/Existing/Change of Ownership of the File

FIG. 4D

REPUTATION PROFILE PROPAGATION ON BLOCKCHAIN NETWORKS

BACKGROUND

The present disclosure relates to processing of operations on a blockchain network, and more specifically reputation profile propagation on a blockchain network.

A blockchain is a list of cryptographically linked records, called blocks. Blockchains may be used to regulate different types of core assets using tokens. A token is a unit of account that possess unique, encoded functionality (e.g., as in the case of smart contracts).

SUMMARY

Embodiments of the present disclosure include a method, system, and computer program product for reputation profile propagation on a blockchain networks.

Embodiments of the present disclosure include a system comprising a memory, and a processor in communication with the memory, the processor being configured to perform operations comprising initiating a non-fungible token identity, establishing a profile for the non-fungible token identity, receiving reputation data related to the non-fungible token identity, determining, based on the reputation data, a reputation score, appending the non-fungible token identity with the reputation score as a non-fungible token metadata tag, and uploading the non-fungible token identity and the metadata tag to an ID repository.

Additional embodiments of the present disclosure include a method comprising initiating, by a node in the blockchain network, a non-fungible token identity, establishing, by the node, a profile for the non-fungible token identity, receiving, by the node, reputation data related to the non-fungible token identity, determining, by the node based on the reputation data, a reputation score, appending, by the node, the non-fungible token identity with the reputation score as a non-fungible token metadata tag, and uploading, by the node, the non-fungible token identity and the metadata tag to an ID repository.

Further embodiments of the present disclosure include a computer program product comprising a computer readable storage medium having program instructions embodied therewith, the program instructions executable by a processor to cause the processors to perform a method, the method comprising initiating an identity, establishing a profile for the identity, receiving reputation data related to the identity, determining, based on the reputation data, a reputation score, appending the identity with the reputation score as a metadata tag, and uploading the identity and the metadata tag to an ID repository.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

FIG. 4D illustrates a block which may represent the structure of blocks in the blockchain, according to example embodiments.

Figure 1:
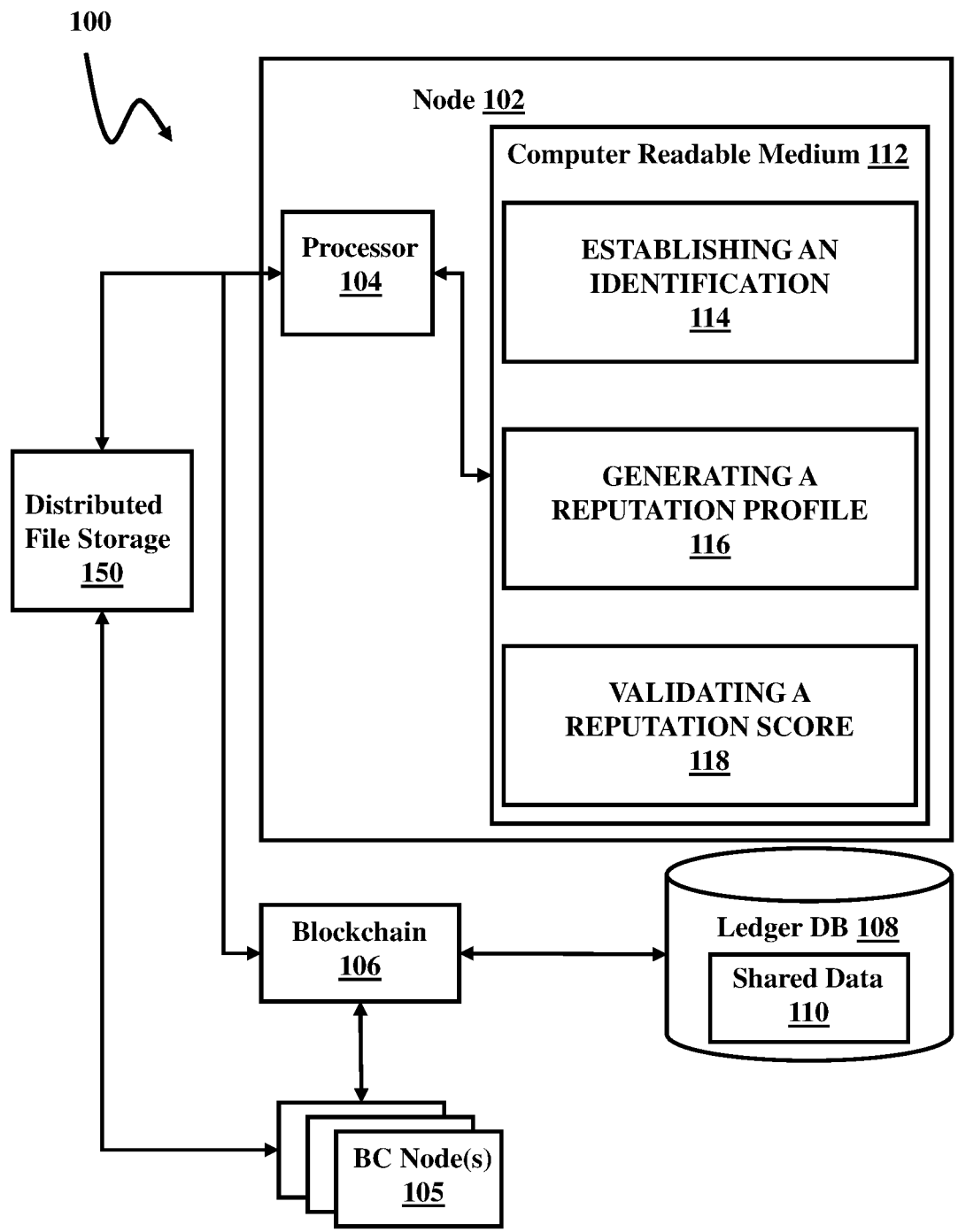
FIG. 1 illustrates a network diagram of a system including a database, according to example embodiments.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate to processing of operations on a blockchain network, and more specifically to reputation profile propagation on blockchain networks.

It will be readily understood that the instant components, as generally described and illustrated in the figures herein, may be arranged and designed in a wide variety of different configurations. Accordingly, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one embodiment. Accordingly, appearances of the phrases "example embodiments," "in some embodiments," "in other embodiments," or other similar language, throughout this specification do not necessarily all refer to the same group of embodiments, and the described features, structures, or characteristics may be combined or removed in any suitable manner in one or more embodiments. Further, in the FIGS., any connection between elements can permit one-way and/or two-way communication even if the depicted connection is a one-way or two-way arrow. Also, any device depicted in the drawings can be a different device. For example, if a mobile device is shown sending information, a wired device may also be used to send the information.

In addition, while the term "message" may have been used in the description of embodiments, the application may be applied to many types of networks and data. Furthermore, while certain types of connections, messages, and signaling may be depicted in exemplary embodiments, the application is not limited to a certain type of connection, message, and signaling.

In some embodiments, the method, system, and/or computer program product utilize a decentralized database (such as a blockchain) that is a distributed storage system, which includes multiple nodes that communicate with each other. The decentralized database includes an append-only immutable data structure resembling a distributed ledger capable of maintaining records between mutually untrusted parties. The untrusted parties are referred to herein as peers or peer nodes. Each peer maintains a copy of the database records, and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency.

In various embodiments, a permissioned and/or a permission-less blockchain can be used. In a public or permission-less blockchain, anyone can participate without a specific identity (e.g., retaining anonymity). Public blockchains can involve native cryptocurrency and use consensus based on various protocols such as Proof of Work. On the other hand, a permissioned blockchain database provides secure interactions among a group of entities which share a common goal but which do not fully trust one another, such as businesses that exchange funds, goods, information, and the like.

Further, in some embodiments, the method, system, and/or computer program product can utilize a blockchain that operates arbitrary, programmable logic, tailored to a decentralized storage scheme and referred to as "smart contracts" or "chaincodes." In some cases, specialized chaincodes may exist for management functions and parameters which are referred to as system chaincode. The method, system, and/or computer program product can further utilize smart contracts that are trusted distributed applications which leverage tamper-proof properties of the blockchain database and an underlying agreement between nodes, which is referred to as an endorsement or endorsement policy. Blockchain transactions associated with this application can be "endorsed" before being committed to the blockchain, while transactions which are not endorsed are disregarded.

An endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

In some embodiments, the method, system, and/or computer program product can utilize nodes that are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer) and broadcasts transaction-proposals to an ordering service (e.g., ordering node).

Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes. In some instances, an ordering service node implements a delivery guarantee, such as a broadcast to each of the peer nodes in the system when committing/confirming transactions and modifying a world state of the blockchain. World state is another name for the initial blockchain transaction which normally includes control and setup information.

In some embodiments, the method, system, and/or computer program product can utilize a ledger that is a sequenced, tamper-resistant record of all state transitions of a blockchain. State transitions may result from chaincode invocations (e.g., transactions) submitted by participating parties (e.g., client nodes, ordering nodes, endorser nodes, peer nodes, etc.). Each participating party (such as a peer node) can maintain a copy of the ledger. A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain.

In some embodiments, the method, system, and/or computer program product described herein can utilize a chain that is a transaction log that is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (e.g., local, attached storage, cloud, etc.), efficiently supporting the append-only nature of the blockchain workload.

The current state of the immutable ledger represents the latest values for all keys that are included in the chain transaction log. Since the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log; it can therefore be regenerated from the chain at any time. The state database may automatically be recovered (or generated if needed) upon peer node startup and before transactions are accepted.

Blockchain is different from a traditional database in that blockchain is not a central storage, but rather a decentralized, immutable, and secure storage, where nodes may share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein.

In particular, the blockchain ledger data is immutable, and that provides for an efficient method for processing operations in blockchain networks. Also, use of the encryption in the blockchain provides security and builds trust. The smart contract manages the state of the asset to complete the life-cycle, thus specialized nodes may ensure that blockchain operations with anonymity requirements are able to securely submit operations to the blockchain network. The example blockchains are permission decentralized. Thus, each end user may have its own ledger copy to access. Multiple organizations (and peers) may be on-boarded on the blockchain network. The key organizations may serve as endorsing peers to validate the smart contract execution results, read-set and write-set. In other words, the blockchain inherent features provide for efficient implementation of processing a private transaction in a blockchain network.

One of the benefits of the example embodiments is that they improve the functionality of a computing system by implementing a method for processing a private transaction in a blockchain network. Through the blockchain system described herein, a computing system (or a processor in the computing system) can perform functionality for private transaction processing utilizing blockchain networks by providing access to capabilities such as distributed ledger, peers, encryption technologies, MSP, event handling, etc. Also, the blockchain enables creating a business network and making any users or organizations to on-board for participation. As such, the blockchain is not just a database. The blockchain comes with capabilities to create a network of users and on-board/off-board organizations to collaborate and execute service processes in the form of smart contracts.

Meanwhile, a traditional database may not be useful to implement the example embodiments because a traditional database does not bring all parties on the network, a traditional database does not create trusted collaboration, and a traditional database does not provide for an efficient method of securely and efficiently submitting operations. The traditional database does not provide for a tamper proof storage and does not provide for guaranteed valid transactions. Accordingly, the example embodiments provide for a specific solution to a problem in the arts/field of anonymously submitting operations in a blockchain network.

FIG. 1 illustrates a logic network diagram 100 for smart data annotation in blockchain networks, according to example embodiments.

Referring to FIG. 1, the example network 100 includes a node 102 connected to other blockchain (BC) nodes 105 representing document-owner organizations. The node 102 may be connected to a blockchain 106 that has a ledger 108 for storing data to be shared 110 among the nodes 105. While this example describes in detail only one node 102, multiple such nodes may be connected to the blockchain 106. It should be understood that the node 102 may include additional components and that some of the components described herein may be removed and/or modified without departing from a scope of the node 102 disclosed herein. The node 102 may be a computing device or a server computer, or the like, and may include a processor 104, which may be a semiconductor-based microprocessor, a central processing unit (CPU), an application specific integrated circuit (ASIC), a field-programmable gate array (FPGA), and/or another hardware device. Although a single processor 104 is depicted, it should be understood that the node 102 may include multiple processors, multiple cores, or the like, without departing from the scope of the node 102 system. A distributed file storage 150 may be accessible to processor node 102 and other BC nodes 105. The distributed file storage 150 may be used to store documents identified in ledger 108.

The node 102 may also include a non-transitory computer readable medium 112 that may have stored thereon machine-readable instructions executable by the processor 104. Examples of the machine-readable instructions are shown as 114-118 and are further discussed below. Examples of the non-transitory computer readable medium 112 may include an electronic, magnetic, optical, or other physical storage device that contains or stores executable instructions. For example, the non-transitory computer readable medium 112 may be a Random Access memory (RAM), an Electrically Erasable Programmable Read-Only Memory (EEPROM), a hard disk, an optical disc, or other type of storage device.

The processor 104 may execute machine-readable instructions 114 to establish an identification. As discussed above, the blockchain ledger 108 may store data to be shared 110 among the nodes 105. The blockchain 106 network may be configured to use one or more smart contracts that manage transactions for multiple participating nodes. Documents linked to the annotation information may be stored in distributed file storage 150. The processor 104 may execute machine-readable instructions 116 to generate a reputation profile. The processor 104 may execute machine-readable instructions 118 to validate a reputation score.

Figure 2A:
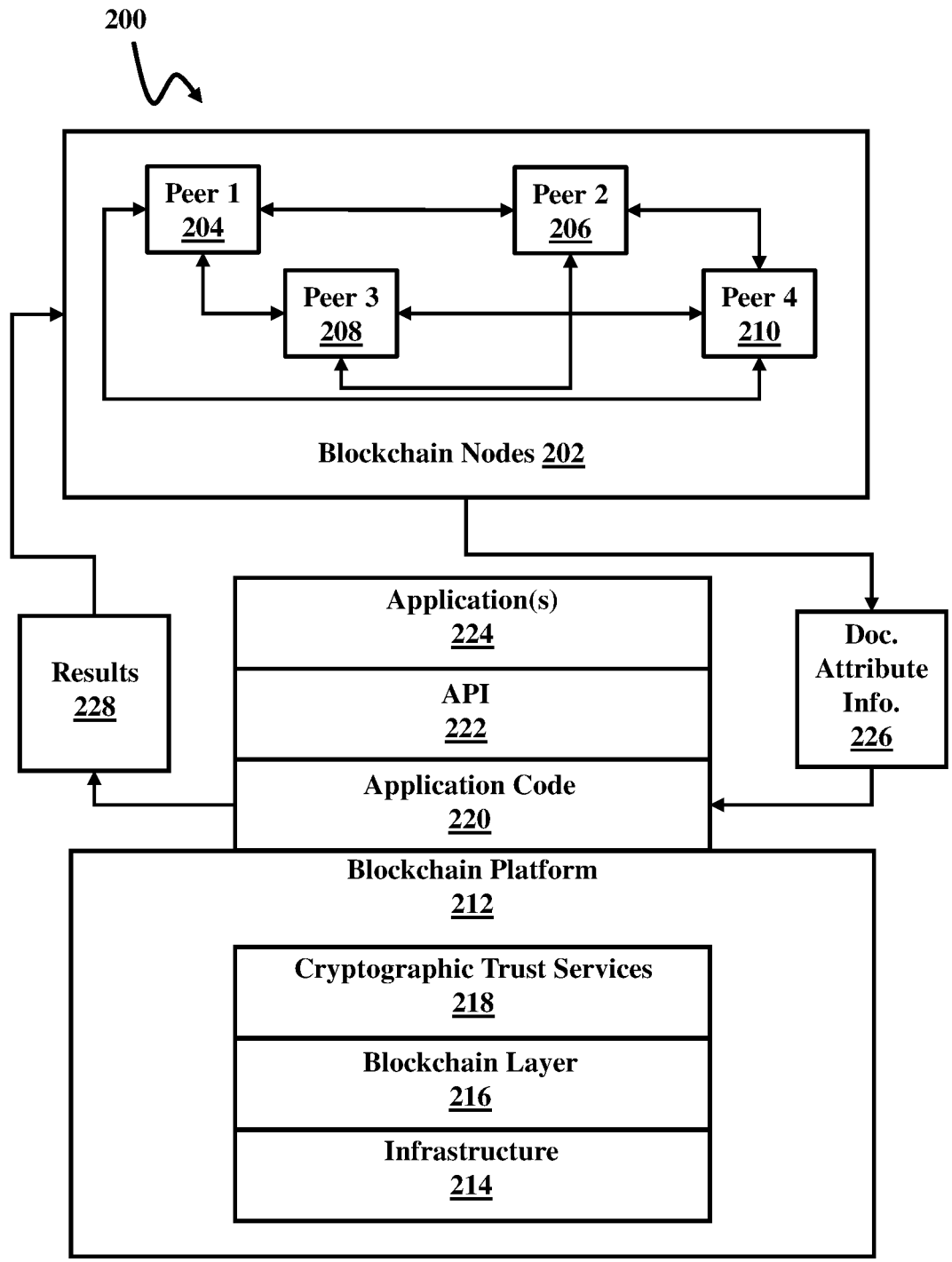
FIG. 2A illustrates an example blockchain architecture configuration, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more peer nodes 204-210 (these four nodes are depicted by example only). These nodes participate in a number of activities, such as blockchain transaction addition and validation processes (consensus). One or more of the blockchain nodes 204-210 may endorse transactions based on an endorsement policy and may provide an ordering service for all blockchain nodes 202 in the architecture 200. A blockchain node 204-210 may initiate a blockchain authentication and seek to write to a blockchain immutable ledger stored in blockchain layer 216, a copy of which may also be stored on an underpinning physical infrastructure 214. The blockchain configuration 200 may include one or more applications 224 which are linked to application programming interfaces (APIs) 222 to access and execute stored program/application code 220 (e.g., chaincode, smart contracts, etc.) which can be created according to a customized configuration sought by participants and can maintain the participant's own state, control the participant's own assets, and receive external information. This can be deployed as a transaction and installed, via appending to the distributed ledger, on all blockchain nodes 204-210.

A blockchain base or platform 212 may include various layers of blockchain data, services (e.g., cryptographic trust services, virtual execution environment, etc.), and underpinning physical computer infrastructure 214 that may be used to receive and store new transactions and provide access to auditors which are seeking to access data entries. The blockchain layer 216 may expose an interface that provides access to the virtual execution environment necessary to process the program code 220 and engage the physical infrastructure 214. Cryptographic trust services 218 may be used to verify transactions such as asset exchange transactions and keep information private.

The blockchain architecture configuration 200 of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, document attribute(s) information 226 may be processed by one or more processing entities (e.g., virtual machines) included in the blockchain layer 216. Results 228 of this processing may include a plurality of linked shared documents. The physical infrastructure 214 may be utilized to retrieve any of the data or information described herein.

A smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details.

Figure 2B:
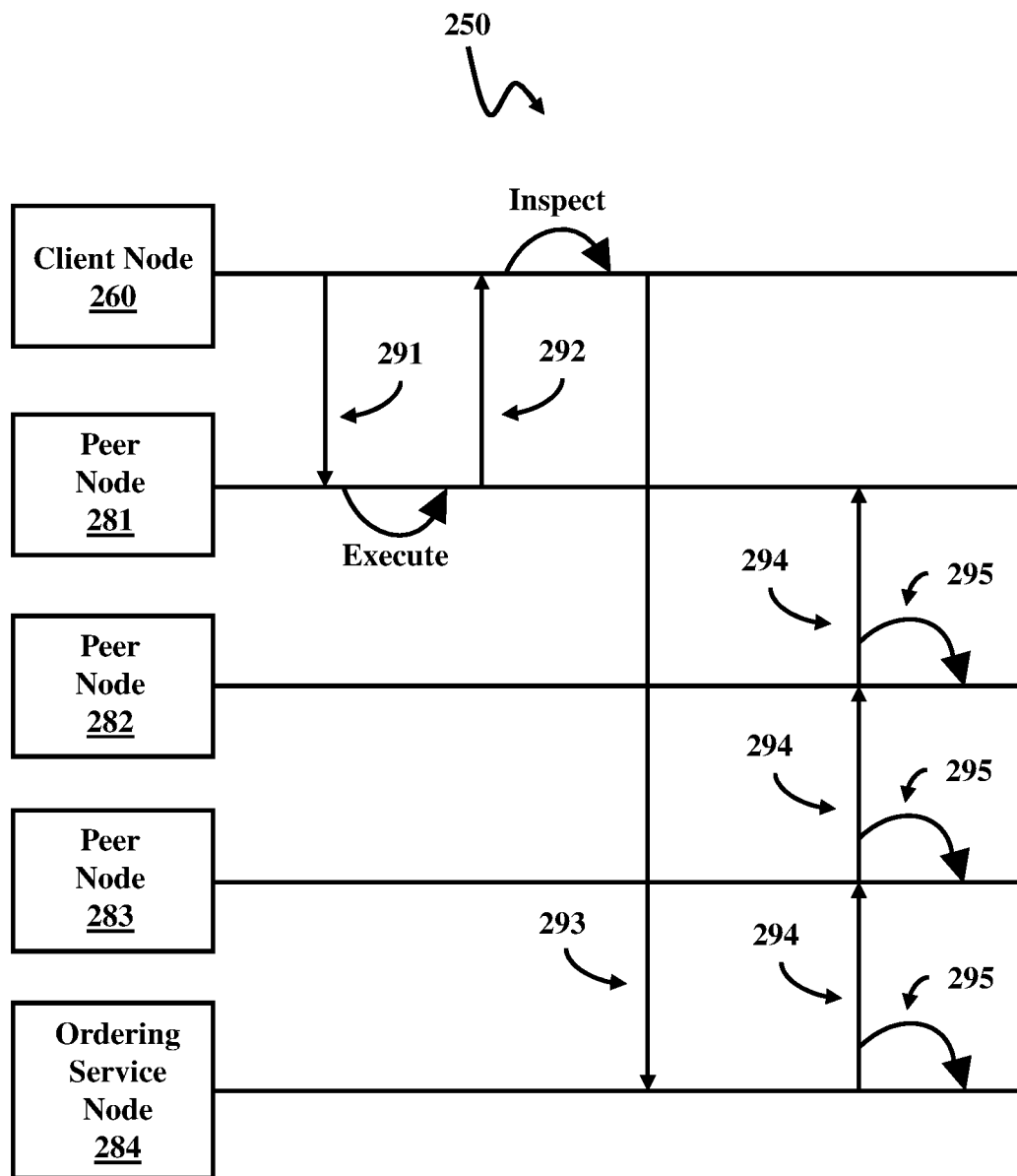
FIG. 2B illustrates a blockchain transactional flow, according to example embodiments.

FIG. 2B illustrates an example of a blockchain transactional flow 250 between nodes of a blockchain (e.g., blockchain 106 illustrated in FIG. 1), in accordance with an example embodiment. Referring to FIG. 2B, a general description of the transactional flow 250 will be given followed by a more specific example. The transactional flow 250 may include a transaction proposal 291 sent by an application client node 260 to a first endorsing peer node 281. The first endorsing peer 281 may verify a client signature and execute a chaincode function to initiate the transaction. The output may include the chaincode results, a set of key/value versions that were read in the chaincode (read set), and the set of keys/values that were written in chaincode (write set). A proposal response 292 is sent back to the client 260 along with an endorsement signature, if approved. The client 260 assembles the endorsements into a transaction payload 293 and broadcasts it to an ordering service (fourth peer) node 284. The ordering service node 284 then delivers ordered transactions as blocks to all additional peers 281-283 on the same channel. Before committal to the blockchain, each additional peer 281-283 may validate the transaction. For example, the peers 281-283 may check the endorsement policy to ensure that the correct allotment of the peers specified in transaction proposal 291 have signed the results and authenticated the signatures against the transaction payload 293. In some embodiments, one or more of the peers may be manager nodes.

A more specific description of transactional flow 250 can be understood with a more specific example. To begin, the client node 260 initiates the transaction proposal 291 by constructing and sending a request to the first peer node 281, which is an endorser. The client 260 may include an application leveraging a supported software development kit (SDK), which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. The set of transaction results, along with the endorsing peer node's 281 signature is passed back as a proposal response 292 to the SDK of the client 260 which parses the payload for the application to consume.

In response, the application of the client 260 inspects/verifies the endorsing peer's 281 signature and compares the proposal response 292 to determine if the proposal response 292 is valid. If the chaincode only queried the ledger, the application would inspect the query response and would typically not submit the transaction to the ordering service node 284. If the client application intends to submit the transaction to the ordering service node 284 to update the ledger, the application determines if the specified endorsement policy has been fulfilled before submitting (i.e., did all peer nodes necessary for the transaction endorse the transaction). Here, the client 260 may include only one of multiple parties to the transaction. In this case, each client may have their own endorsing node, and each endorsing node may need to endorse the transaction. The architecture is such that even if an application selects not to inspect responses or otherwise forwards an unendorsed transaction, the endorsement policy may still be enforced by peers and upheld at the commit validation phase.

After successful inspection, the client 260 assembles endorsements into a transaction 293 and broadcasts the transaction proposal and response within a transaction message to the ordering node 284. The transaction 293 may contain the read/write sets, the endorsing peer's signatures and a channel ID. The ordering node 284 does not need to inspect the entire content of a transaction in order to perform its operation. Instead, the ordering node 284 may simply receive transactions from all channels in the network, order them chronologically by channel, and create blocks of transactions per channel.

The blocks of the transaction 293 are delivered from the ordering node 284 to all other peer nodes 281-283 on the channel. Transactions 294 within the block are validated to ensure any endorsement policy is fulfilled and to ensure that there have been no changes to ledger state for read set variables since the read set was generated by the transaction execution. Transactions 294 in the block are tagged as being valid or invalid. Furthermore, in operation 295 each peer node 281-283 appends the block to the channel's chain, and for each valid transaction the write sets are committed to current state database. An event is emitted to notify the client application that the transaction (invocation) 293 has been immutably appended to the chain, as well as to notify whether the transaction 293 was validated or invalidated.

Figure 3A:
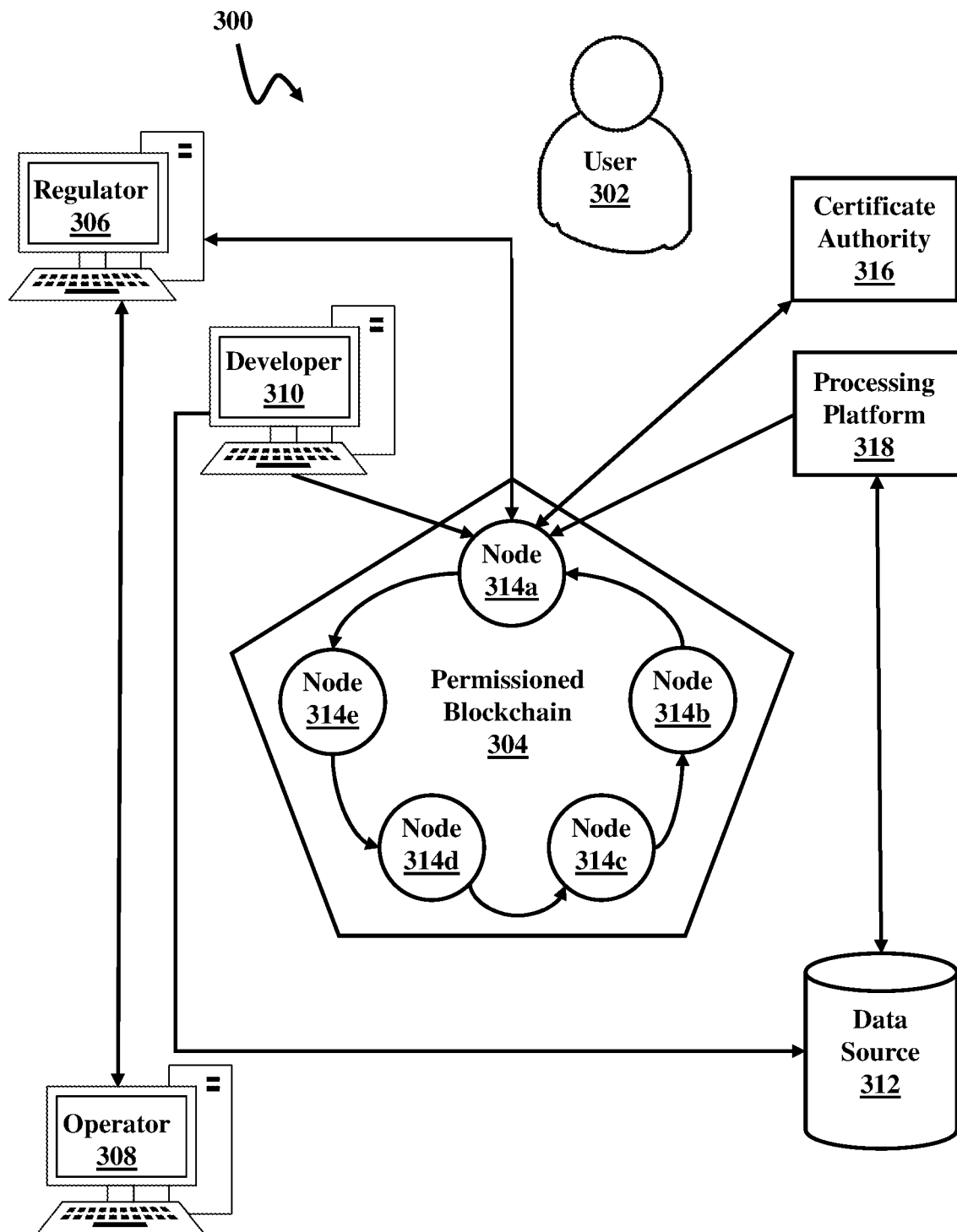
FIG. 3A illustrates a permissioned network, according to example embodiments.

FIG. 3A illustrates an example of a permissioned blockchain network 300, in accordance with an example embodiment, which features a distributed, decentralized peer-to-peer architecture. In this example, a blockchain user 302 may initiate a transaction to a permissioned blockchain 304. In this example, the transaction can be a deploy, invoke, or query, and may be issued through a client-side application leveraging an SDK, directly through an API, etc. The network 300 may provide access to a regulator 306, such as an auditor. A blockchain network operator 308 manages member permissions, such as enrolling the regulator 306 as an "auditor" and the blockchain user 302 as a "client." An auditor may be restricted only to querying the ledger whereas a client may be authorized to deploy, invoke, and query certain types of chaincode.

A blockchain developer 310 can write chaincode and client-side applications. The blockchain developer 310 can deploy chaincode directly to the network 300 through an interface. To include credentials from a traditional data source 312 in chaincode, the developer 310 may use an out-of-band connection to access the data. In this example, the blockchain user 302 connects to the permissioned blockchain 304 through one of peer nodes 314 (referring to any one of nodes 314a-e). Before proceeding with any transactions, the peer node 314 (e.g., node 314a) retrieves the user's 302 enrollment and transaction certificates from a certificate authority 316, which manages user roles and permissions. In some cases, blockchain users must possess these digital certificates in order to transact on the permissioned blockchain 304. Meanwhile, a user attempting to utilize chaincode may be required to verify their credentials on the traditional data source 312. To confirm the user's 302 authorization, chaincode can use an out-of-band connection to this data through a traditional processing platform 318.

Figure 3B:
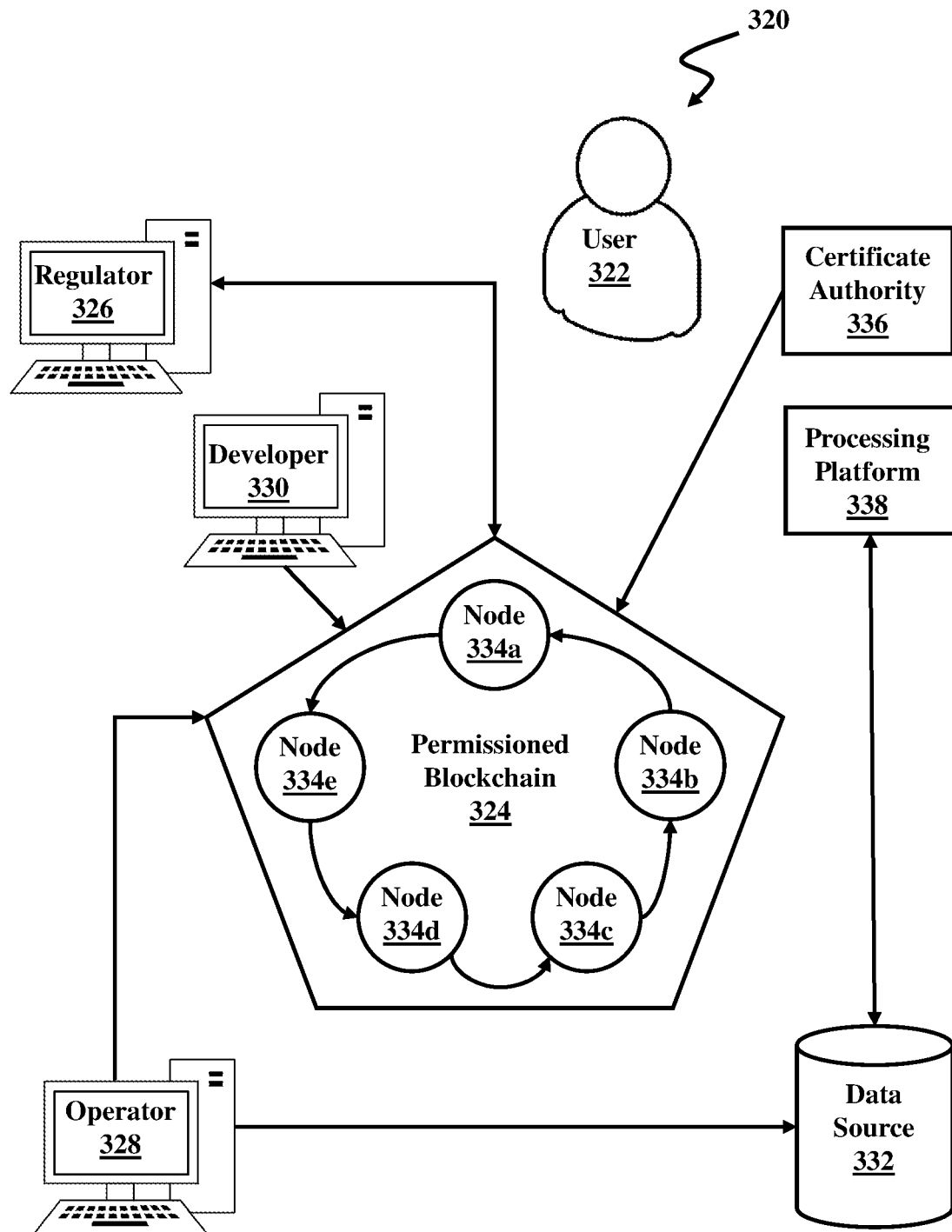
FIG. 3B illustrates another permissioned network, according to example embodiments.

FIG. 3B illustrates another example of a permissioned blockchain network 320, in accordance with an example embodiment, which features a distributed, decentralized peer-to-peer architecture. In this example, a blockchain user 322 may submit a transaction to a permissioned blockchain 324. In this example, the transaction can be a deploy, invoke, or query, and may be issued through a client-side application leveraging an SDK, directly through an API, etc. Networks may provide access to a regulator 326, such as an auditor. A blockchain network operator 328 manages member permissions, such as enrolling the regulator 326 as an "auditor" and the blockchain user 322 as a "client." An auditor may be restricted to only querying the ledger whereas a client may be authorized to deploy, invoke, and query certain types of chaincode.

A blockchain developer 330 writes chaincode and client-side applications. The blockchain developer 330 can deploy chaincode directly to the network through an interface. To include credentials from a traditional data source 332 in chaincode, the developer 330 may use an out-of-band connection to access the data. In this example, the blockchain user 322 connects to the network through a peer node 334 (referring to any one of nodes 334a-e). Before proceeding with any transactions, the peer node 334 (e.g., node 334a) retrieves the user's enrollment and transaction certificates from a certificate authority 336. In some cases, blockchain users must possess these digital certificates in order to transact on the permissioned blockchain 324. Meanwhile, a user attempting to utilize chaincode may be required to verify their credentials on the traditional data source 332. To confirm the user's authorization, chaincode can use an out-of-band connection to this data through a traditional processing platform 338.

In some embodiments of the present disclosure, a blockchain herein may be a permissionless blockchain. In contrast with permissioned blockchains (e.g., blockchains 304 and 324) which require permission to join, anyone can join a permissionless blockchain. For example, to join a permissionless blockchain a user may create a personal address and begin interacting with the network by submitting transactions, and hence adding entries to the ledger. Additionally, all parties have the choice of running a node on the system and employing the mining protocols to help verify transactions.

Figure 3C:
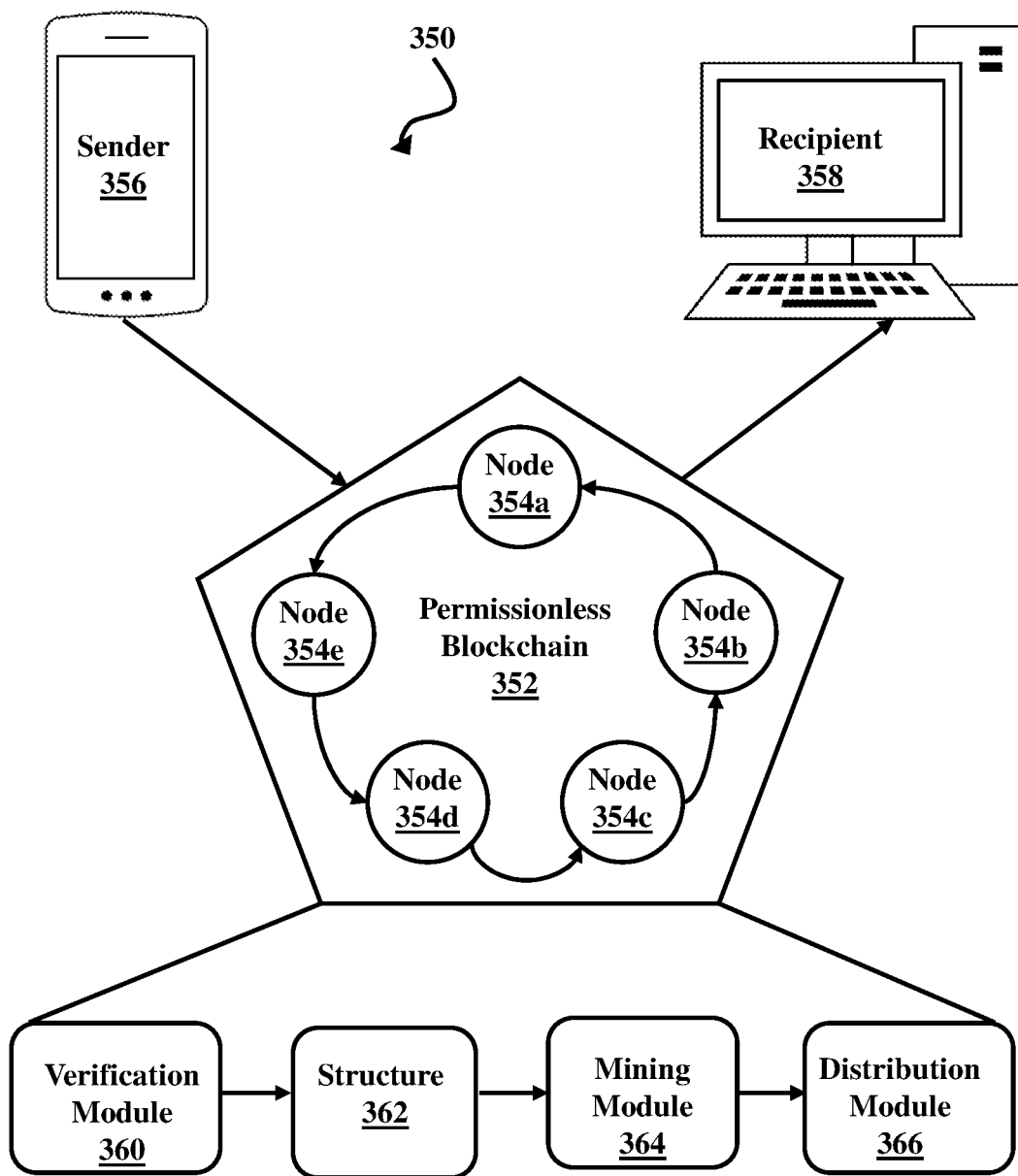
FIG. 3C illustrates a permissionless network, according to example embodiments.

FIG. 3C illustrates a network 350 with a transaction being processed by a permissionless blockchain 352 including a plurality of nodes 354, in accordance with an example embodiment. A sender 356 desires to send payment or some other form of value (e.g., a deed, medical records, a contract, a good, a service, or any other asset that can be encapsulated in a digital record) to a recipient 358 via the permissionless blockchain 352. In some embodiments, each of the sender device 356 and the recipient device 358 may have digital wallets (associated with the blockchain 352) that provide user interface controls and a display of transaction parameters. In response, the transaction is broadcast throughout the blockchain 352 to the nodes 354 (referring to any one of nodes 354a-e).

Depending on the blockchain's 352 network parameters the nodes use verification module 360 to verify the transaction based on rules (which may be pre-defined or dynamically allocated) established by the permissionless blockchain 352 creators. For example, this may include verifying identities of the parties involved, etc. The transaction may be verified immediately or it may be placed in a queue with other transactions and the nodes 354 determine if the transactions are valid based on a set of network rules.

In structure 362, valid transactions are formed into a block and sealed with a lock (hash). This process may be performed by mining nodes among the nodes 354. Mining nodes may utilize additional software specifically for mining and creating blocks for the permissionless blockchain 352. Each block may be identified by a hash (e.g., 256 bit number, etc.) created using an algorithm agreed upon by the network 350. Each block may include a header, a pointer or reference to a hash of a previous block's header in the chain, and a group of valid transactions. The reference to the previous block's hash is associated with the creation of the secure independent chain of blocks.

Before blocks can be added to the blockchain 352, the blocks must be validated. Validation for the permissionless blockchain 352 may include a proof-of-work (PoW) which is a solution to a puzzle derived from the block's header. Although not shown in the example of FIG. 3C, another process for validating a block is proof-of-stake. Unlike the proof-of-work, where the algorithm rewards miners who solve mathematical problems, with the proof of stake, a creator of a new block is chosen in a deterministic way, depending on its wealth, also defined as "stake." Then, a similar proof is performed by the selected/chosen node.

With mining module 364, nodes try to solve the block by making incremental changes to one variable until the solution satisfies a network-wide target. This creates the PoW thereby ensuring correct answers. In other words, a potential solution must prove that computing resources were drained in solving the problem. In some types of permissionless blockchains, miners may be rewarded with value (e.g., coins, etc.) for correctly mining a block.

Here, the PoW process, alongside the chaining of blocks, makes modifications to the blockchain 352 extremely difficult, as an attacker must modify all subsequent blocks in order for the modifications to one block to be accepted. Furthermore, as new blocks are mined, the difficulty of modifying a block increases, and the number of subsequent blocks increases. With a distribution module 366, the successfully validated block is distributed through the permissionless blockchain 352 and all nodes 354 add the block to a majority chain which is the permissionless blockchain's 352 auditable ledger. Furthermore, the value in the transaction submitted by the sender 356 is deposited or otherwise transferred to the digital wallet of the recipient device 358.

Figure 4A:
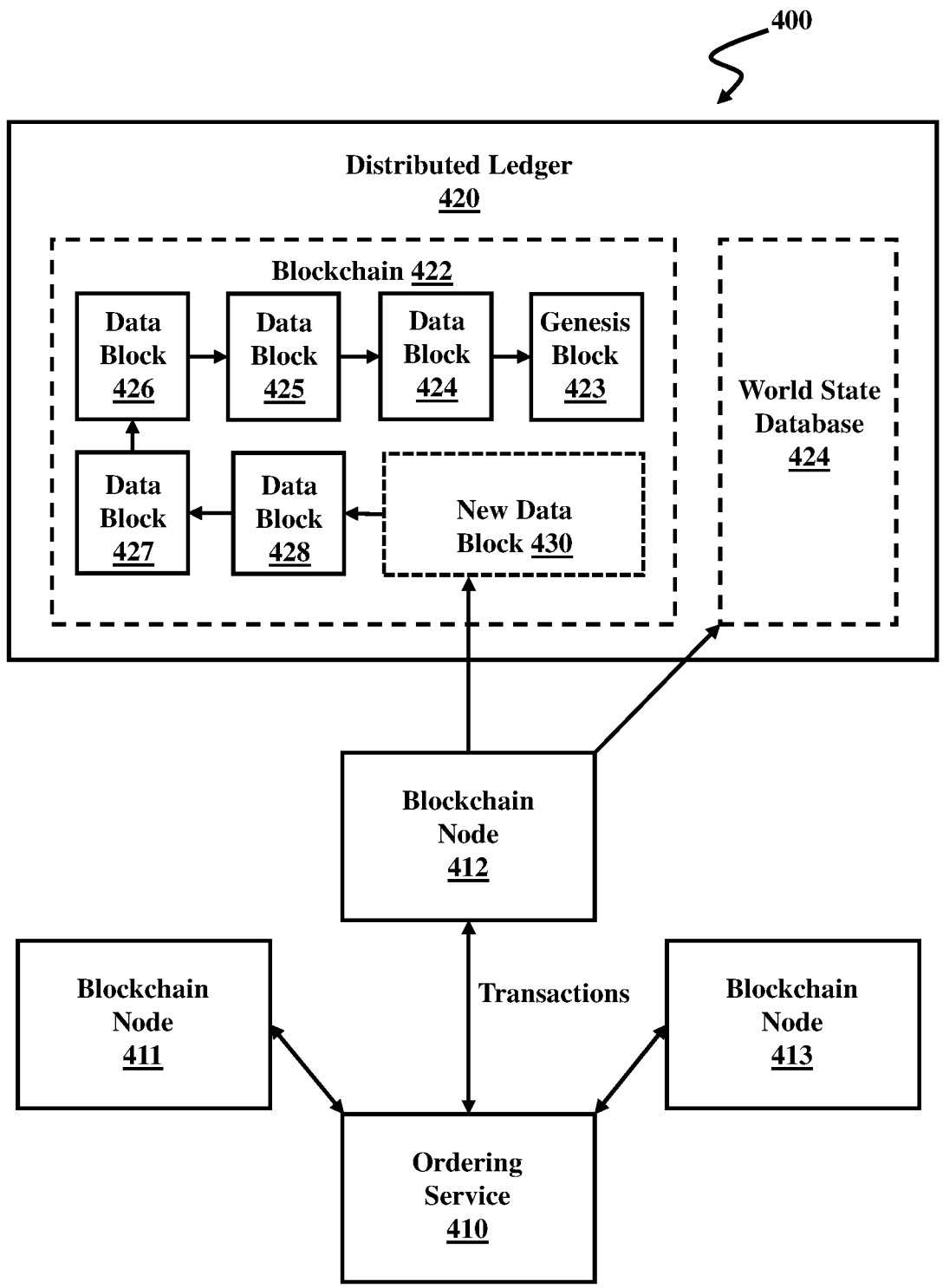
FIG. 4A illustrates a process for a new block being added to a distributed ledger, according to example embodiments.
Figure 4B:
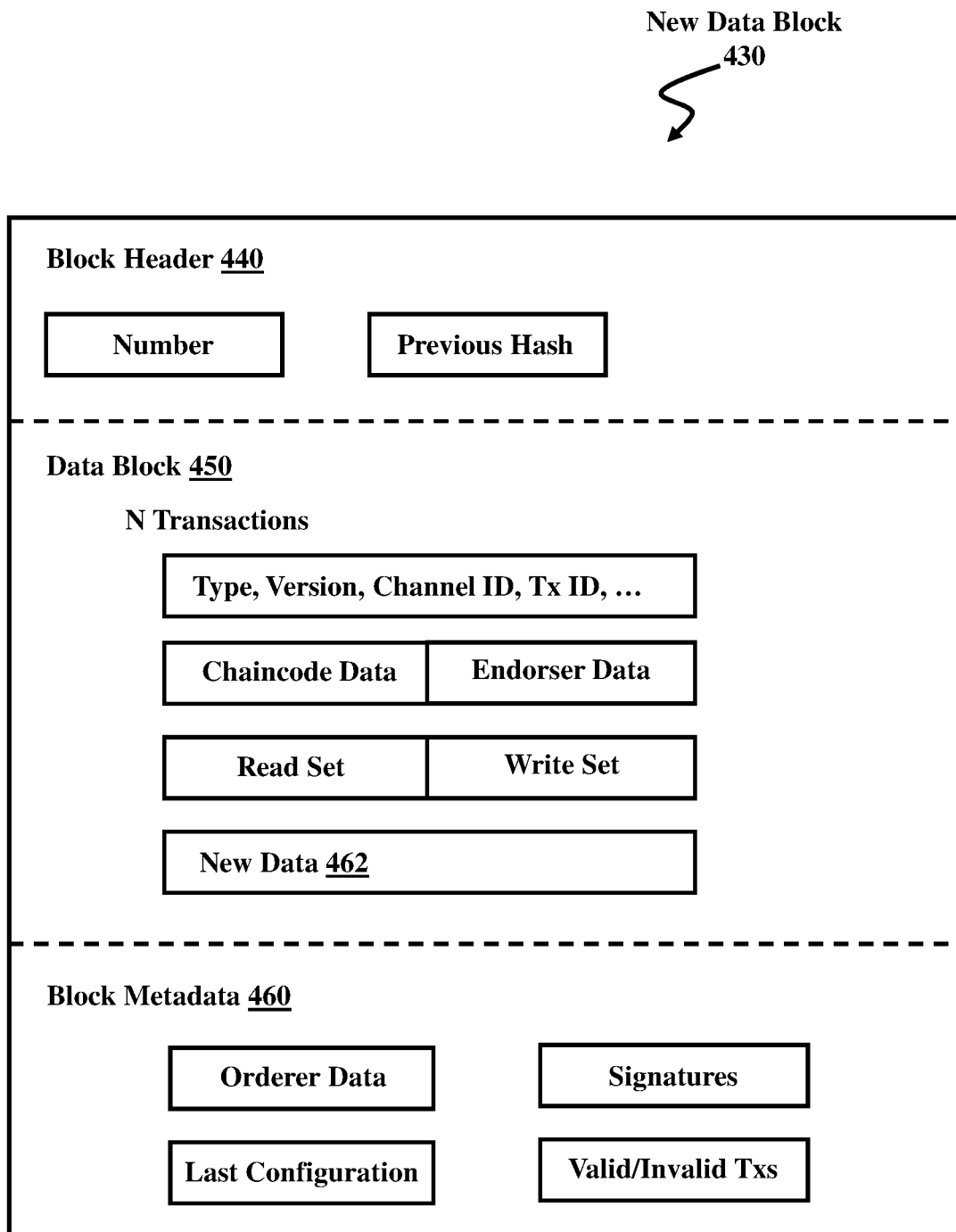
FIG. 4B illustrates contents of a new data block, according to example embodiments.

FIG. 4A illustrates a blockchain system performing process 400 of a new block being added to a distributed ledger 420, according to example embodiments, and FIG. 4B illustrates contents of a new data block structure 430 for blockchain, according to example embodiments. The new data block 430 may contain document linking data.

Referring to FIG. 4A, clients (not shown) may submit transactions to blockchain nodes 411, 412, and/or 413 in process 400. Clients may be instructions received from any source to enact activity on the blockchain 422. As an example, clients may be applications that act on behalf of a requester, such as a device, person or entity to propose transactions for the blockchain 422. The plurality of blockchain peers (e.g., blockchain nodes 411, 412, and 413) may maintain a state of the blockchain network and a copy of the distributed ledger 420. Different types of blockchain nodes/peers may be present in the blockchain network including endorsing peers which simulate and endorse transactions proposed by clients and committing peers which verify endorsements, validate transactions, and commit transactions to the distributed ledger 420. In this example, each of blockchain nodes 411, 412, and 413 may perform a role of endorser node, committer node, or both.

The distributed ledger 420 includes a blockchain which stores immutable, sequenced records in blocks (e.g., data blocks 423-430), and a state database 424 (current world state) maintaining a current state of the blockchain 422. One distributed ledger 420 may exist per channel and each peer maintains its own copy of the distributed ledger 420 for each channel of which they are a member. The blockchain 422 is a transaction log, structured as hash-linked blocks where each block contains a sequence of N transactions. Blocks may include various components such as shown in FIG. 4B. The linking (shown by arrows in FIG. 4A) of the blocks (e.g., data blocks 423-430) may be generated by adding a hash of a prior block's header within a block header of a current block. In this way, all transactions on the blockchain 422 are sequenced and cryptographically linked together preventing tampering with blockchain data without breaking the hash links. Furthermore, because of the links, the latest block (e.g., data block 430) in the blockchain 422 represents every transaction that has come before it. The blockchain 422 may be stored on a peer file system (local or attached storage), which supports an append-only blockchain workload.

The current state of the blockchain 422 and the distributed ledger 420 may be stored in the state database 424. Here, the current state data represents the latest values for all keys ever included in the chain transaction log of the blockchain 422. Chaincode invocations execute transactions against the current state in the state database 424. To make these chaincode interactions extremely efficient, the latest values of all keys are stored in the state database 424. The state database 424 may include an indexed view into the transaction log of the blockchain 422. It can therefore be regenerated from the chain at any time. The state database 424 may automatically get recovered (or generated if needed) upon peer startup, before transactions are accepted.

Endorsing nodes (411, 412, and/or 413) receive transactions from clients and endorse the transaction based on simulated results. Endorsing nodes hold smart contracts which simulate the transaction proposals. When an endorsing node endorses a transaction, the endorsing node creates a transaction endorsement which is a signed response from the endorsing node to the client application indicating the endorsement of the simulated transaction. The method of endorsing a transaction depends on an endorsement policy which may be specified within chaincode. An example of an endorsement policy is "the majority of endorsing peers must endorse the transaction." Different channels may have different endorsement policies. Endorsed transactions are forward by the client application to ordering service 410.

The ordering service 410 accepts endorsed transactions, orders them into a block, and delivers the blocks to the committing peers. For example, the ordering service 410 may initiate a new block when a threshold of transactions has been reached, a timer times out, or another condition. In the example of FIG. 4A, blockchain node 412 is a committing peer that has received a new data block 430 for storage on blockchain 422. The first block 423 in the blockchain 422 may be referred to as a genesis block which includes information about the blockchain, its members, the data stored therein, etc.

The ordering service 410 may be made up of a cluster of orderers. The ordering service 410 does not process transactions, smart contracts, or maintain the shared ledger. Rather, the ordering service 410 may accept the endorsed transactions and specifies the order in which those transactions are committed to the distributed ledger 420. The architecture of the blockchain network may be designed such that the specific implementation of 'ordering' (e.g., Solo, Kafka, Byzantine fault-tolerant, etc.) becomes a pluggable component.

Transactions are written to the distributed ledger 420 in a consistent order. The order of transactions is established to ensure that the updates to the state database 424 are valid when they are committed to the network. Unlike a cryptocurrency blockchain system (e.g., Bitcoin, etc.) where ordering occurs through the solving of a cryptographic puzzle, or mining, in this example the parties of the distributed ledger 420 may choose the ordering mechanism that best suits that network.

When the ordering service 410 initializes a new data block 430, the new data block 430 may be broadcast to committing peers (e.g., blockchain nodes 411, 412, and 413). In response, each committing peer validates the transaction within the new data block 430 by checking to make sure that the read set and the write set still match the current world state in the state database 424. Specifically, the committing peer can determine whether the read data that existed when the endorsers simulated the transaction is identical to the current world state in the state database 424. When the committing peer validates the transaction, the transaction is written to the blockchain 422 on the distributed ledger 420, and the state database 424 is updated with the write data from the read-write set. If a transaction fails, that is, if the committing peer finds that the read-write set does not match the current world state in the state database 424, the transaction ordered into a block may still be included in that block, but it may be marked as invalid, and the state database 424 may not be updated.

Referring to FIG. 4B, the new data block 430 (also referred to as a data block) that is stored on the blockchain 422 of the distributed ledger 420 may include multiple data segments such as a block header 440, block data 450, and block metadata 460. It should be appreciated that the various depicted blocks and their contents, such as new data block 430 and its contents. Shown in FIG. 4B are merely examples and are not meant to limit the scope of the example embodiments. The new data block 430 may store transactional information of N transaction(s) (e.g., 1, 10, 100, 500, 1000, 2000, 3000, etc.) within the block data 450. The new data block 430 may also include a link to a previous block (e.g., on the blockchain 422 in FIG. 4A) within the block header 440. In particular, the block header 440 may include a hash of a previous block's header. The block header 440 may also include a unique block number (e.g., data block 423-430), a hash of the block data 450 of the new data block 430, and the like. The block number of the new data block 430 may be unique and assigned in various orders, such as an incremental/sequential order starting from zero.

The block data 450 may store transactional information of each transaction that is recorded within the new data block 430. For example, the transaction data may include one or more of a type of the transaction, a version, a timestamp, a channel ID of the distributed ledger 420, a transaction ID, an epoch, a payload visibility, a chaincode path (deploy transaction), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

In some embodiments, the block data 450 may also store new data 462 which adds additional information to the hash-linked chain of blocks in the blockchain 422. The additional information includes one or more of the steps, features, processes and/or actions described or depicted herein. Accordingly, the new data 462 can be stored in an immutable log of blocks on the distributed ledger 420. Some of the benefits of storing such new data 462 are reflected in the various embodiments disclosed and depicted herein.

Although in FIG. 4B the new data 462 is depicted in the block data 450, it may also be located in the block header 440 or the block metadata 460. The new data 462 may include a document composite key that is used for linking the documents within an organization.

The block metadata 460 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 410. Meanwhile, a committer of the block (such as blockchain node 412) may add validity/invalidity information based on an endorsement policy, verification of read/write sets, and the like. The transaction filter may include a byte array of a size equal to the number of transactions in the block data 450 and a validation code identifying whether a transaction was valid/invalid.

Figure 4C:
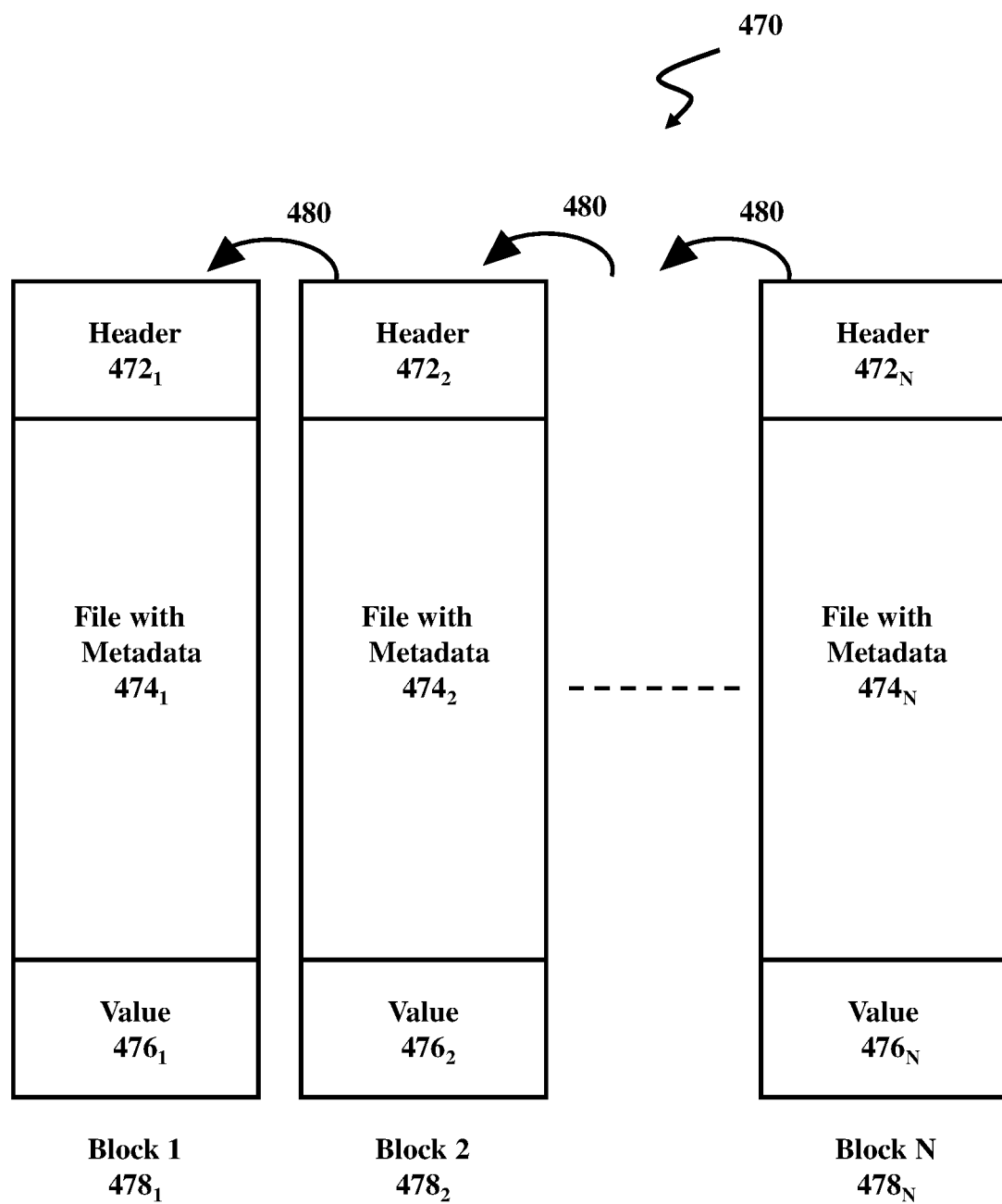
FIG. 4C illustrates a blockchain for digital content, according to example embodiments.

FIG. 4C illustrates a blockchain 470 for digital content in accordance with some embodiments described herein. The digital content may include one or more files and associated information. The files may include media, images, video, audio, text, links, graphics, animations, web pages, documents, or other forms of digital content. The immutable, append-only aspects of the blockchain serve as a safeguard to protect the integrity, validity, and authenticity of the digital content, making it suitable for use in legal proceedings where admissibility rules apply or other settings where evidence is taken in to consideration or where the presentation and use of digital information is otherwise of interest. In this case, the digital content may be referred to as digital evidence.

The blockchain may be formed in various ways. In some embodiments, the digital content may be included in and accessed from the blockchain itself. For example, each block of the blockchain may store a hash value of reference information (e.g., header, value, etc.) along the associated digital content. The hash value and associated digital content may then be encrypted together. Thus, the digital content of each block may be accessed by decrypting each block in the blockchain, and the hash value of each block may be used as a basis to reference a previous block. This may be illustrated as follows:

| Block 1 | Block 2 | ... | Block N |
|---|---|---|---|
| Hash Value 1 | Hash Value 2 | | Hash Value N |
| Digital Content 1 | Digital Content 2 | | Digital Content N |

In some embodiments, the digital content may be not included in the blockchain. For example, the blockchain may store the encrypted hashes of the content of each block without any of the digital content. The digital content may be stored in another storage area or memory address in association with the hash value of the original file. The other storage area may be the same storage device used to store the blockchain or may be a different storage area or even a separate relational database. The digital content of each block may be referenced or accessed by obtaining or querying the hash value of a block of interest and then looking up that has value in the storage area, which is stored in correspondence with the actual digital content. This operation may be performed, for example, a database gatekeeper. This may be illustrated as follows:

| Blockchain | Storage Area |
| --- | --- |
| Block 1 Hash Value | Block 1 Hash Value . . . Content |
| . | . |
| . | . |
| . | . |
| Block N Hash Value | Block N Hash Value . . . Content |

In the example embodiment of FIG. 4C, the blockchain 470 includes a number of blocks $478_1$, $478_2$, . . . $478_N$ cryptographically linked in an ordered sequence, where N≥1. The encryption used to link the blocks $478_1$, $478_2$, . . . $478_N$ may be any of a number of keyed or un-keyed Hash functions. In some embodiments, the blocks $478_1$, $478_2$, . . . $478_N$ are subject to a hash function which produces n-bit alphanumeric outputs (where n is 256 or another number) from inputs that are based on information in the blocks. Examples of such a hash function include, but are not limited to, a SHA-type (SHA stands for Secured Hash Algorithm) algorithm, Merkle-Damgard algorithm, HAIFA algorithm, Merkle-tree algorithm, nonce-based algorithm, and a non-collision-resistant Pseudo Random Function (PRF). In another embodiment, the blocks $478_1$, $478_2$, . . . , $478_N$ may be cryptographically linked by a function that is different from a hash function. For purposes of illustration, the following description is made with reference to a hash function, e.g., SHA-2.

Each of the blocks $478_1$, $478_2$, . . . , $478_N$ in the blockchain includes a header, a version of the file, and a value. The header and the value are different for each block as a result of hashing in the blockchain. In some embodiments, the value may be included in the header. As described in greater detail below, the version of the file may be the original file or a different version of the original file.

The first block $478_1$ in the blockchain is referred to as the genesis block and includes a header $472_1$, original file $474_1$, and an initial value $476_1$. The hashing scheme used for the genesis block, and indeed in all subsequent blocks, may vary. For example, all the information in the first block $478_1$ may be hashed together at one time, or a portion of the information in the first block $478_1$ may be separately hashed and then a hash of the separately hashed portions may be performed.

The second header $472_1$ may include one or more initial parameters, which, for example, may include a version number, timestamp, nonce, root information, difficulty level, consensus protocol, duration, media format, source, descriptive keywords, and/or other information associated with original file $474_1$ and/or the blockchain. The first header $472_1$ may be generated automatically (e.g., by blockchain network managing software) or manually by a blockchain participant. Unlike the header in other blocks $478_2$ to $478_N$ in the blockchain, the header $472_1$ in the genesis block $478_1$ does not reference a previous block, simply because there is no previous block.

The original file $474_1$ in the genesis block may be, for example, data as captured by a device with or without processing prior to its inclusion in the blockchain. The original file $474_1$ is received through the interface of the system from the device, media source, or node. The original file $474_1$ is associated with metadata, which, for example, may be generated by a user, the device, and/or the system processor, either manually or automatically. The metadata may be included in the first block $478_1$ in association with the original file $474_1$.

The value $476_1$ in the genesis block is an initial value generated based on one or more unique attributes of the original file $474_1$. In some embodiments, the one or more unique attributes may include the hash value for the original file $474_1$, metadata for the original file $474_1$, and other information associated with the file. In one implementation, the initial value $476_1$ may be based on the following unique attributes:

1) SHA-2 computed hash value for the original file
2) originating device ID
3) starting timestamp for the original file
4) initial storage location of the original file
5) blockchain network member ID for software to currently control the original file and associated metadata The other blocks $478_2$ to $478_N$ in the blockchain also have headers, files, and values. However, unlike header $472_1$ the first block, each of the headers $472_2$ to $472_N$ in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 480, to establish an auditable and immutable chain-of-custody.

Each of the headers $472_2$ to $472_N$ in the other blocks may also include other information, e.g., version number, timestamp, nonce, root information, difficulty level, consensus protocol, and/or other parameters or information associated with the corresponding files and/or the blockchain in general.

The files $474_2$ to $474_N$ in the other blocks may be equal to the original file or may be modified versions of the original file in the genesis block depending, for example, on the type of processing performed. The type of processing performed may vary from block to block. The processing may involve, for example, any modification of a file in a preceding block, such as redacting information or otherwise changing the content of, taking information away from, or adding or appending information to the files.

Additionally, or alternatively, the processing may involve merely copying the file from a preceding block, changing a storage location of the file, analyzing the file from one or more preceding blocks, moving the file from one storage or memory location to another, or performing action relative to the file of the blockchain and/or its associated metadata. Processing which involves analyzing a file may include, for example, appending, including, or otherwise associating various analytics, statistics, or other information associated with the file.

The values in each of the other blocks $476_2$ to $476_N$ in the other blocks are unique values and are all different as a result of the processing performed. For example, the value in any one block corresponds to an updated version of the value in the previous block. The update is reflected in the hash of the block to which the value is assigned. The values of the blocks therefore provide an indication of what processing was performed in the blocks and also permit a tracing through the blockchain back to the original file. This tracking confirms the chain-of-custody of the file throughout the entire blockchain.

For example, consider the case where portions of the file in a previous block are redacted, blocked out, or pixelated in order to protect the identity of a person shown in the file. In this case, the block including the redacted file may include metadata associated with the redacted file, e.g., how the redaction was performed, who performed the redaction, timestamps where the redaction(s) occurred, etc. The metadata may be hashed to form the value. Because the metadata for the block is different from the information that was hashed to form the value in the previous block, the values are different from one another and may be recovered when decrypted.

In some embodiments, the value of a previous block may be updated (e.g., a new hash value computed) to form the value of a current block when any one or more of the following occurs. The new hash value may be computed by hashing all or a portion of the information noted below, in this example embodiment.

a) new SHA-2 computed hash value if the file has been processed in any way (e.g., if the file was redacted, copied, altered, accessed, or some other action was taken)
 b) new storage location for the file
 c) new metadata identified associated with the file
 d) transfer of access or control of the file from one blockchain participant to another blockchain participant FIG. 4D illustrates a block 490 which may represent the structure of the blocks in the blockchain (e.g., 470) in accordance with some embodiments. The block, e.g., $Block_i$, includes a header $472_i$, file $474_i$, and a value $476_i$.

The header $472_i$ includes a hash value of a previous block Blocki−1 and additional reference information, which, for example, may be any of the types of information (e.g., header information including references, characteristics, parameters, etc.) discussed herein. All blocks reference the hash of a previous block except, of course, the genesis block. The hash value of the previous block may be just a hash of the header in the previous block or a hash of all or a portion of the information in the previous block, including the file and metadata.

The file $474_i$ includes a plurality of data, such as Data 1, Data 2, . . . , Data N in sequence. The data are tagged with Metadata 1, Metadata 2, . . . , Metadata N which describe the content and/or characteristics associated with the data. For example, the metadata for each data may include information to indicate a timestamp for the data, process the data, keywords indicating the persons or other content depicted in the data, and/or other features that may be helpful to establish the validity and content of the file as a whole, and particularly its use a digital evidence, for example, as described in connection with an embodiment discussed below. In addition to the metadata, each data may be tagged with reference REF 1, REF 2, . . . , REF N to a previous data to prevent tampering, gaps in the file, and sequential reference through the file.

Once the metadata is assigned to the data (e.g., through a smart contract), the metadata cannot be altered without the hash changing, which can easily be identified for invalidation. The metadata, thus, creates a data log of information that may be accessed for use by participants in the blockchain.

The value $476_i$ is a hash value or other value computed based on any of the types of information previously discussed. For example, for any given block, $Block_i$, the value for that block may be updated to reflect the processing that was performed for that block, e.g., new hash value, new storage location, new metadata for the associated file, transfer of control or access, identifier, or other action or information to be added. Although the value in each block is shown to be separate from the metadata for the data of the file and header, the value may be based, in part or whole, on this metadata in another embodiment.

Once the block 490 is formed, at any point in time, the immutable chain-of-custody for the file may be obtained by querying the blockchain for the transaction history of the values across the blocks. This query, or tracking procedure, may begin with decrypting the value of the block that is most currently included (e.g., the last ($N^{th}$) block), and then continuing to decrypt the value of the other blocks until the genesis block is reached and the original file is recovered. The decryption may involve decrypting the headers and files and associated metadata at each block, as well.

Decryption is performed based on the type of encryption that took place in each block. This may involve the use of private keys, public keys, or a public key-private key pair. For example, when asymmetric encryption is used, blockchain participants or a processor in the network may generate a public key and private key pair using a predetermined algorithm. The public key and private key are associated with each other through some mathematical relationship. The public key may be distributed publicly to serve as an address to receive messages from other users, e.g., an IP address or home address. The private key is kept secret and used to digitally sign messages sent to other blockchain participants. The signature is included in the message so that the recipient can verify using the public key of the sender. This way, the recipient can be sure that only the sender may have sent this message.

Generating a key pair may be analogous to creating an account on the blockchain, but without having to actually register anywhere. Also, every transaction that is executed on the blockchain is digitally signed by the sender using their private key. This signature ensures that only the owner of the account can track and process (if within the scope of permission determined by a smart contract) the file of the blockchain.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

Figure 5:
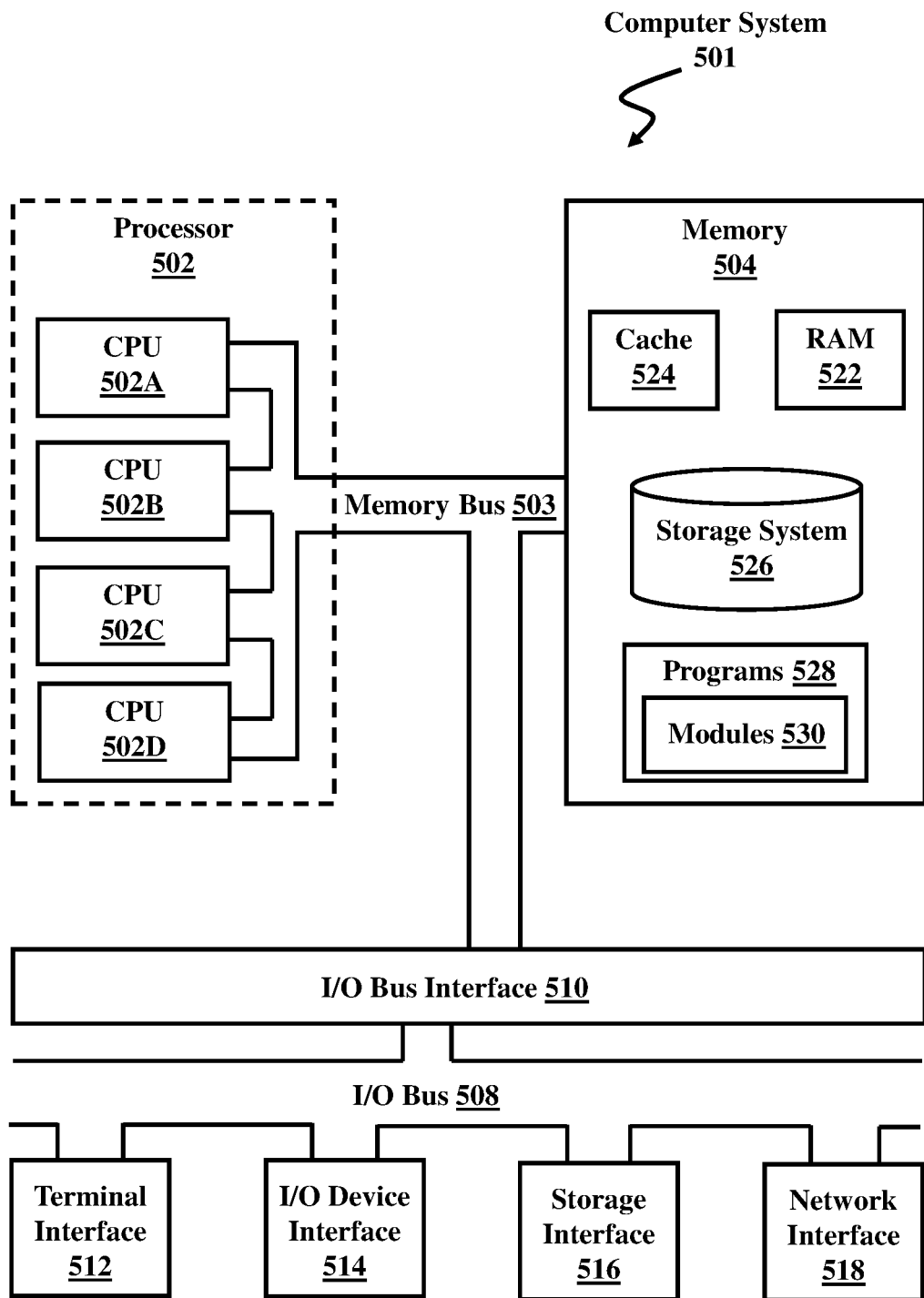
FIG. 5 illustrates a high-level block diagram of an example computer system that may be used in implementing one or more of the methods, tools, and modules, and any related functions, described herein, in accordance with embodiments of the present disclosure.

FIG. 5, illustrated is a high-level block diagram of an example computer system 501 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 501 may comprise one or more CPUs 502, a memory subsystem 504, a terminal interface 512, a storage interface 516, an I/O (Input/Output) device interface 514, and a network interface 518, all of which may be communicatively coupled, directly or indirectly, for inter-component communication via a memory bus 503, an I/O bus 508, and an I/O bus interface unit 510.

The computer system 501 may contain one or more general-purpose programmable central processing units (CPUs) 502A, 502B, 502C, and 502D, herein generically referred to as the CPU 502. In some embodiments, the computer system 501 may contain multiple processors typical of a relatively large system; however, in other embodiments the computer system 501 may alternatively be a single CPU system. Each CPU 502 may execute instructions stored in the memory subsystem 504 and may include one or more levels of on-board cache.

System memory 504 may include computer system readable media in the form of volatile memory, such as random access memory (RAM) 522 or cache memory 524. Computer system 501 may further include other removable/non-removable, volatile/non-volatile computer system storage media. By way of example only, storage system 526 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 504 can include flash memory, e.g., a flash memory stick drive or a flash drive. Memory devices can be connected to memory bus 503 by one or more data media interfaces. The memory 504 may include at least one program product having a set (e.g., at least one) of program modules that are configured to carry out the functions of various embodiments.

One or more programs/utilities 528, each having at least one set of program modules 530 may be stored in memory 504. The programs/utilities 528 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 528 and/or program modules 530 generally perform the functions or methodologies of various embodiments.

Although the memory bus 503 is shown in FIG. 5 as a single bus structure providing a direct communication path among the CPUs 502, the memory subsystem 504, and the I/O bus interface 510, the memory bus 503 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 501 may, in some embodiments, contain multiple I/O bus interface units 510, multiple I/O buses 508, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 501 may be a multi-user mainframe computer system, a single-user system, or a server computer or similar device that has little or no direct user interface, but receives requests from other computer systems (clients). Further, in some embodiments, the computer system 501 may be implemented as a desktop computer, portable computer, laptop or notebook computer, tablet computer, pocket computer, telephone, smartphone, network switches or routers, or any other appropriate type of electronic device.

It is noted that FIG. 5 is intended to depict the representative major components of an exemplary computer system 501. In some embodiments, however, individual components may have greater or lesser complexity than as represented in FIG. 5, components other than or in addition to those shown in FIG. 5 may be present, and the number, type, and configuration of such components may vary.

Reputation systems, also called review systems, are programs or algorithms that allow users, clients, and venders to rate profiles in order to build trust through reputation. With the popularity of online communities for shopping, advice, and exchange of other important information, reputation systems are becoming vitally important to the online experience. One use for reputation systems is that even if the consumer has not yet tried a product or service, the consumer can still be reasonably confident in the outcome of the exchange through the information given by a reputation, or in the antithesis, the consumer can be warned of the outcome if there is not a good reputation. Reputation systems gather a collective opinion in order to build trust between users of an online community.

Reputation systems impact trust relationships in network interactions. There is an implicit need for reliable reputation ratings in ever more numerous digital interactions, not only for individuals, but also for enterprises participating in various networks. In some instances, a reputation system evaluates reputation data, such as activities (e.g., purchases, game play, reviews given or received, etc.), associated with profiles and assigns profiles a metric, such as a rank or score.

Reputation metrics also play an important role on digital networks, and many peer to peer (P2P) platforms where participant's interactions are digitally amplified. Typically, each platform (e.g., network, marketplace, etc.) has a native reputation system that works independently and is abstract from the unique identity of the profile holder (individuals, organizations, companies, etc.). Users (e.g., vendors and consumers) may create several different accounts, one for each platform, with relative ease. Without incentive to improve reputation score, any user with a poor rating need only create a new account to start off with a neutral score. The main issue is that most networks have their own system for reputation scoring. Reputation metrics are currently established based only on interactions with a single network—there is no portability of a computational model for reputation profiles across networks. This is a detriment to not only the networks themselves, but also to well-established and diligent participants that need to create a new reputation score for every network they interact with. Having to create a new profile can be a barrier to participate on a new network since a participant may not be able to take advantage of rewards for a well-established reputation (e.g., credit, liquidity, or preferred terms) previously earned on another network.

Currently, one blockchain network has little to no knowledge of information that might exist in a different blockchain. For instance, a blockchain network for a first organization may exist fully independently of a blockchain network for a second organization—in the sense that each blockchain network has no knowledge of any information recorded on the other blockchain network. Blockchain-based projects are isolated from each other, despite existing within the same industry and working with the same technology.

In some instances, an identification may be tokenized into a non-fungible token (a) such as a utility token. A utility token allows holders of the token to access specific benefits, rewards, or services, akin to a membership. Typically, this is associated with the services that a particular project offers to its users. For example, a driver for a gig economy company may have a non-fungible token (NFT) for identification (ID) in the company's blockchain network. In some instances, the gig economy is based on flexible, temporary, or freelance jobs, often involving connecting with clients or customers through an online platform.

Figure 6:
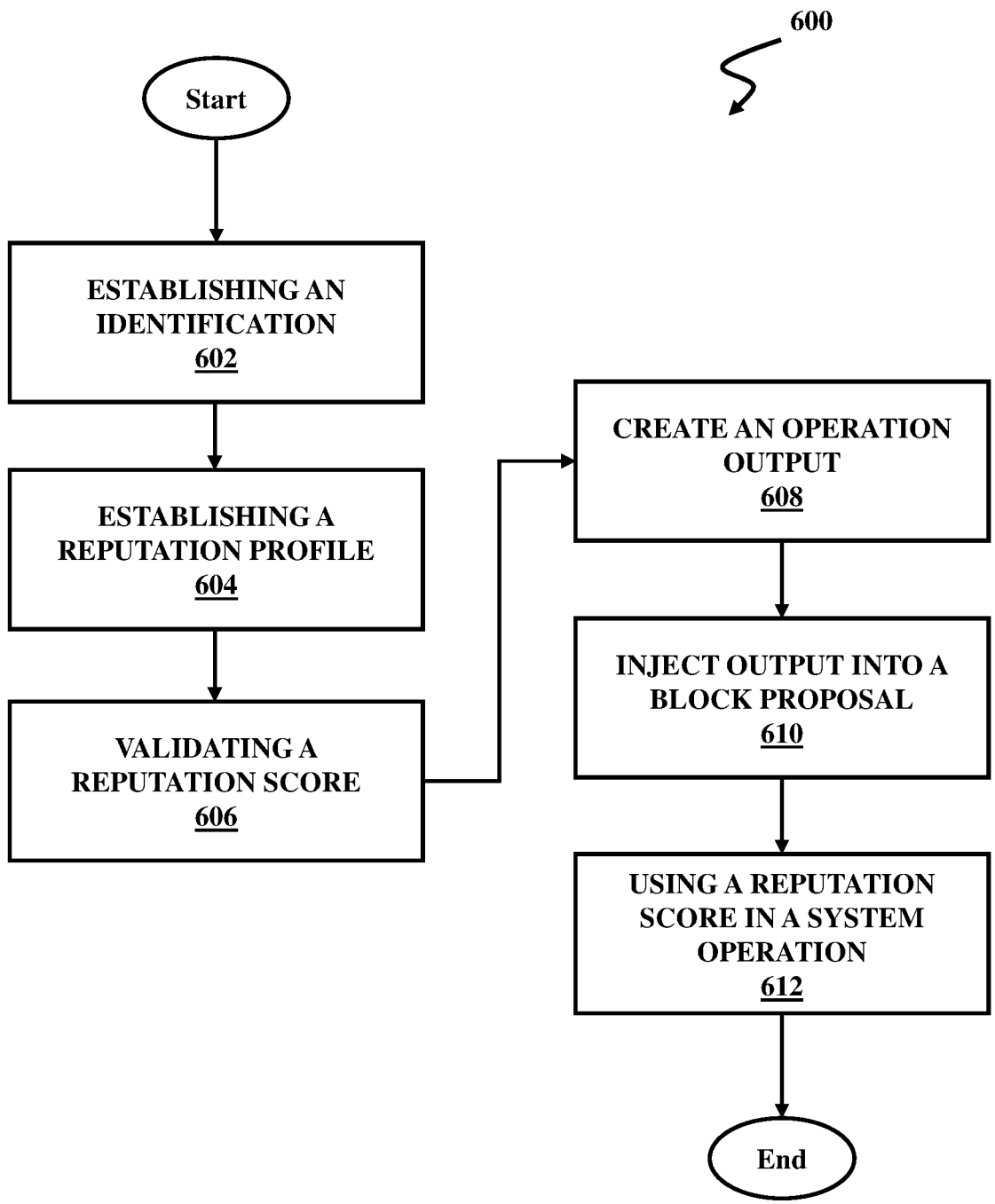
FIG. 6 illustrates a flowchart of a process of reputation profile propagation on blockchain networks, according to example embodiments.

Referring now to FIG. 6, illustrated is a flowchart for process 600 of reputation profile propagation on blockchain networks, in accordance with embodiments of the present disclosure.

Process 600 begins with operation 602 of establishing an ID for a profile. In some embodiments, operation 602 is performed by an identity issuance and verification system. In some embodiments, the identity issuance and verification system includes instructions to create an identity or retrieve an identity that has previously been created, as discussed below.

In some embodiments, the identification is an identity token which is an NFT and the identification may be stored in an identity repository that provides an NFT state registry, referred to as an ID registry herein. This registry is used to maintain NFT ID token states and verification/validation of reputation scores, and other related meta tag support such a reputation score. In some embodiments, the NFT token may be integrated into an identity as a service (IDaaS) infrastructure to augment identity with reputation information. For example, reputation scores may be maintained by a third party IDaaS provider.

In some embodiments, the establishing includes generating a new identification for a participant. For example, for a new driver of a delivery service, where the driver has never driven for a delivery service before, the system may need to generate a new unique identification. In some embodiments, an ID may be based on a previously established ID for an entity or user. Some examples of previously established IDs may include an employer identification number, a driver's license number, a social security number, and/or a name, among others. In some embodiments, the ID may be generated without the use of a previously established ID. For example, some systems may allow users to remain anonymous. The system may demarcate a profile that is not attached to a previously established ID. For example, a tag saying "user is not authenticated," may denote a profile generated without a previously established ID. In some embodiments, the established ID may be stored on an ID repository for use on other networks. For example, the established ID may be stored on the repository, with a reputation generated in operation 604 or 606 below.

In some embodiments, the ID repository has score data from one or more other networks. For example, an ID in the repository may have information related to the ID from another network such as a profile (i.e., a profile similar to the one generated in operation 604 below), a reputation score (i.e., a score similar to the one generated in operation 604 or updated in operation 606 below), one or more modules/rules used to generate a profile score, and/or data that was used to generate a reputation score.

In some embodiments, the establishing includes retrieving an ID that was generated on another network. In some embodiments, the system may interact with an ID repository to retrieve an established ID. For example, a first organization has generated an ID for an employee-driver based on his name. The first organization establishes an ID for the employee-driver and uploads the established ID to an ID repository. If the driver is now employed with the second organization, the second organization may retrieve the ID from the ID repository instead of establishing an additional ID.

Process 600 continues with operation 604 of establishing a reputation profile. In some embodiments, the establishing may include generating a new reputation profile or retrieving a reputation profile from another network. In some embodiments, establishing a profile may invoke a reputation modulator smart contract. Blockchain architecture configuration 200 of FIG. 2A gives more information on smart contracts.

In some embodiments, the profile may be an e-wallet, or linked to an e-wallet where tokens associated with the ID are stored. The e-wallet may incorporate a reputation score linked to the ID for the use of digital currencies or linked accounts. The wallet may become an element of transferrable reputation and used as a factor for related actions. For example, a wallet may be used by a user to transfer an ID token from one network to another.

In some embodiments, the reputation modulator smart contract may direct a node on the blockchain network to retrieve data from other networks that is stored in the ID repository. For example, a first organization may retrieve information from the ID repository for a driver, where the information was uploaded to an ID repository by a second organization.

In some embodiments, reputation data (such as activities associated with a profile) may be received by the blockchain network and linked to the ID. For example, users may periodically submit a review for the driver associated with the ID to a node on the network. The reviews may be electronically logged with the blockchain network and used when the reputation modulator smart contract is invoked. Other ways of receiving data are possible and would be apparent to one skilled in the art. Some examples of reputation data include reviews (an example of activities associated with a profile), transaction history of the profile (an example of activities associated with a profile), age of the profile, activity of the profile, and income of the profile (an example of activities associated with a profile), among others. In some embodiments, the data may be added to the ledger. See FIG. 4A for more detail on adding information to a ledger. In some embodiments, the information may be referenced by the ledger and added to a distributed file storage such as distributed file storage 150 in FIG. 1.

In some embodiments, the reputation modulator smart contract may initiate a process to modulate a reputation profile based on rules embedded in a reputation module engine. For example, a reputation profile may include a reputation score, modules/rules used to generate the score, and/or pertinent information that was processed with the modules/rules to determine the score.

In some embodiments, each module in the reputation modules engine contains specific rules for a specific type of operation (e.g., transaction) that is performed relating to a network ID. The module or specific rules being used may depend on the details of the operation. For example, for a profile linked to a new identification, the blockchain network may only use a simple rule to set a score to zero. In another example, the system may need to use rules to determine a score for a profile linked to an identification that has been imported from another network with linked reputation data. More information on weighting data is discussed below.

In some embodiments, the rules adopted by the blockchain network may weight information to determine a reputation score. For example, trusted information from the network may be given the highest weighting, information uploaded to the ID repository from a trusted partner may be given a medium weighting, and information uploaded to the ID repository from an unverified organization may be given a low weighting. Each network may configure modules/rules and weightings to calculate reputation scores. For example, a first and second organization may each receive the same reputation data, but the modules/rules of the organizations may differ such that each organization may calculate a different final score.

In some embodiments, the modulation to create profiles may be run in batch, bulk, or after every transaction that requires the creation of a profile. For example, the modulation may be run every hour (batch), after the accumulation of 100 modulation requests (bulk), or for every modulation request. The determination of when to run a modulation may depend on the system requirements. For example, busy systems may run modulations in bulk for efficiency.

After a profile has been created, the derived reputation score is further appended as a part of an ID (for example, as an NFT metadata tag) and provides not only score but provenance of a scoring methodology (i.e., the rules or modules used to calculate the reputation score). For example, an NFT ID may be appended with a score of 4/5 stars and/or what rules/information were used to calculate the score.

Some examples of reputation data that may be considered for a reputation score follow:
 1) Client feedback, if and how they liked the services or products provided
 2) Points calculated based on the numbers of successful payment transactions, the value of each transaction, and period of time in which the transactions took place (e.g., account that has been making successful transactions for 10 years would have a higher score).
 3) Decreasing points for failed transactions (transactions rejected, rolled back, or disputed).
 4) Trusted supplier points—depending on the product quality that is used by satisfied users/different parties.
 5) profile status—e.g., a customer in good standing, vs one that is in default for a financial institution.

In operation 606 a reputation score is validated. In some embodiments, certain factors may invoke a reputation score validation smart contract (referred to as reputation score validator herein) to validate a reputation score after it has been created. For example, validation may be required at regular time intervals, after every review, after a fixed number of reviews, after every transaction, after a set number of transactions, after receiving new information related to a profile, etc. Blockchain architecture configuration 200 of FIG. 2A gives more information on smart contracts. In some embodiments, the reputation score may need to be checked by the blockchain network to determine if it is still valid. In some embodiments, the validation involves running the rules/modules in the reputation module data again to determine if any new reputation data or the age of previous reputation data changes the reputation score and possibly updating the reputation score. For example, initially a profile with only five reviews may have a first reputation score, but after the profile accumulates 100 reviews, the first reputation score may no longer be accurate. In some embodiments, the validation process includes rerunning the rules/modules, or updated rules/modules, on the available reputation data (including both previously run data and/or new data) to generate an updated reputation score. The rerunning may take into account the age of the reputation data, the source of the reputation data, and the type of the reputation data. For example, when calculating an updated reputation score data may be considered, by a rule, less significant as it ages, reputation data from a trusted source may be more significant than data from an untrusted source, and reviews may be more significant than transaction history.

In some embodiments, the reputation score validator performs a check to determine if the reputation score that is appended as a part of an NFT ID metadata tag is valid and verified on demand. For example, a reputation score validator may run one or more of the rules or modules embedded in the reputation module engine, described in operation 604.

In some embodiments, the reputation score validator updates and/or validates a reputation. For example, a null score (e.g., no score) for driver that initially does not have any reputation data (e.g., reviews) may not be valid after other users have given the driver reviews. The reputation score validator may retrieve the null score and the new reviews and run the profile through one or more modules or rules. The score validator may determine a reputation score for the driver and append the driver's NFT ID with a metadata tag indicating his updated reputation score.

In some embodiments, the reputation score validator also acts as a conduit of cross network reputation score validation which enable portability of the reputation score as a part of an identity as a service (IDaaS) infrastructure by ensuring making reputation an integral part of identity but separate from verification and validation.

In some embodiments, the reputation score validation may be performed for every transaction, run in batches, periodically, or some combination therein. For example, a system may have requirements to run high value profiles more often, run low value profiles in batches, and/or run validations at regular intervals. In a specific example, an insurance company may use reputation scores to calculate premiums. The insurance company may validate the scores yearly for renewal or every time there is a claim on the account.

Process 600 continues with operation 608, where a node in the blockchain network creates an operation output (e.g., transaction) for the reputation score. The operational output is used to verify that the reputation score is well formed, the reputation score has not been submitted previously (replay-attack protection), the signature is valid, and that the submitter is authorized to perform the proposed operation on that channel. The first peer node may take the operation output as an argument to the invoked chaincode function. See FIG. 2B for operation outputs. In some embodiments, the operation may be enriched with profile information used to determine the reputation score. For example, the operation may include a hash of reputation data, such as reviews, for a profile. In some embodiments, the creation of the operation output may be a part of the processing of the reputation modulator smart contract in operation 604 or the reputation score validator smart contract in operation 606. For example, the operation output may be performed after a modulation or a validation.

Process 600 continues with operation 610 where the operation output is injected into a block proposal. In some embodiments, the block is recorded on the ledger making a permanent record of the reputation score that is accessible by the entire network. For example, a block may record the reputation score that a driver profile has received and the rules that were used to determine the reputation score. FIG. 3C has more details on creating a block. In some embodiments, post consensus, the block may be committed to the blockchain network ledger and the state of the digital corollary is updated.

Process 600 continues with operation 612 where the network may use a reputation score to evaluate the profile. In some embodiments, the evaluation may be providing the score to another entity. For example, the system may provide a reputation score to a consumer considering a purchase. In some embodiments, the system operation may include adjusting the terms of an interaction with a user. For example, the reputation score may be used to adjust a purchase price. In this example, for a reputation score of 96-100, a bank may provide a same day loan without interest, for a reputation score of 91-95, the bank may provide an on-demand loan with a below market interest rate, and for a reputation score of 86-90, the bank may provide an on-demand loan at a market interest rate. In some embodiments, a reputation score may be used as a guarantee for barter or payment, such as incorporating a reputation score into an agreement for a purchase. For example, a deposit may not be required from a buyer with a reputation score of 100%, but a buyer with a reputation score of 25% may be required to pay full price up front.

In some embodiments, committing a reputation score to the ledger creates an immutable record of the score being associated to the ID. The immutable record provides a permanent record for downstream business functions, insurance, liability, asset ownership, compliance, and accounting. Likewise, the nature of blockchain allows there to be a permanent immutable record of each iteration of asset decay on the record.

In some embodiments, the blockchain transaction output may have a multi-sig scheme to not only ensure a record of the asset transfer/ownership but also the residual liability of the asset—which is a built-in mechanism for incentive economics and is nonexistent in permissioned and supply chain networks.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A system comprising:
a memory; and
a processor in communication with the memory, the processor being configured to perform processes comprising:
   initiating a non-fungible token on a blockchain network, wherein the non-fungible token is linked to an identity;
   establishing a profile, linked to the identity, for the non-fungible token;
   receiving reputation data related to the identity;
   weighting the reputation data based on a trust of the reputation;
   determining, based on the reputation data and one or more reputation rules, a reputation score,
      wherein the one or more reputation rules evaluate a performance of a user linked to the profile,
      wherein the reputation score includes a provenance of a scoring methodology,
      wherein the scoring methodology includes weighting information based on a trust of an information source,
      wherein the reputation score is based on a calculation of points based on a number of successful transactions and a number of failed transactions,
      wherein the reputation score is based on client feedback from one or more reviews associated with the non-fungible token, and
      wherein the reputation score is decreased for a failed transaction;
   appending the non-fungible token with the reputation score as a non-fungible token metadata tag on the blockchain network;
   invoking a reputation score validation smart contract with instructions to validate the reputation score;
   checking to determine that the reputation score, appended as a part of the non-fungible token metadata tag, is valid; and
   uploading, based on the checking, the non-fungible token and the non-fungible token metadata tag to an ID repository.

2. The system of claim 1, the process further comprising:
creating an operation output that includes the non-fungible token metadata tag;
injecting the operation output into a block; and
recording the block to a blockchain ledger.

3. The system of claim 1, wherein the receiving includes retrieving the reputation data from the ID repository, wherein the reputation data was appended to the ID repository by a second blockchain network.

4. The system of claim 1, wherein the determining includes:
retrieving the one or more reputation rules from a reputation module engine, wherein the rules dictate how the reputation data is used to determine the reputation score.

5. A method comprising:
initiating, by a node, a non-fungible token on a blockchain network, wherein the non-fungible token is linked to an identity;
establishing, by the node, a profile, linked to the identity for the non-fungible token;
receiving, by the node, reputation data related to the identity;
weighting the reputation data based on a trust of the reputation;
determining, by the node based on the reputation data and one or more reputation rules, a reputation score,
   wherein the one or more reputation rules evaluate a performance of a user linked to the profile,
   wherein the reputation score includes a provenance of a scoring methodology,
   wherein the scoring methodology includes weighting information based on a trust of an information source,
   wherein the reputation score is based on a calculation of points based on a number of successful transactions and a number of failed transactions,
   wherein the reputation score is based on client feedback from one or more reviews associated with the non-fungible token, and wherein the reputation score is decreased for a failed transaction;

appending, by the node, the non-fungible token with the reputation score as a non-fungible token metadata tag on the blockchain network;

invoking a reputation score validation smart contract with instructions to validate the reputation score;

checking to determine that the reputation score, appended as a part of the non-fungible token metadata tag, is valid; and uploading, by the node based on the checking, the non-fungible token and the non-fungible token metadata tag to an ID repository.

6. The method of claim 5, further comprising:
creating an operation output that includes the non-fungible token metadata tag;
injecting the operation output into a block; and
recording the block to a blockchain ledger.

7. The method of claim 5, wherein the receiving includes retrieving the reputation data from the ID repository, wherein the reputation data was appended to the ID repository by a second blockchain network.

8. The method of claim 5, wherein the determining includes:
retrieving the one or more reputation rules from a reputation module engine, wherein the reputation rules dictate how the reputation data is used to determine the reputation score.

9. The method of claim 5, wherein the reputation score is based on activity associated with the non-fungible token.

10. A computer program product comprising a computer readable storage medium having program instructions embodied therewith, the program instructions executable by a processor to cause the processors to perform a method, the method comprising:
initiating an identity as a non-fungible token on a blockchain network;
establishing a profile, on the blockchain network for the identity as part of the non-fungible token;
receiving reputation data related to the identity;
weighting the reputation data based on a trust of the reputation;
determining, based on the reputation data and one or more reputation rules, a reputation score,
wherein the one or more reputation rules evaluate a performance of a user linked to the profile,
wherein the reputation score includes a provenance of a scoring methodology,
wherein the scoring methodology includes weighting information based on a trust of an information source,
wherein the reputation score is based on a calculation of points based on a number of successful transactions and a number of failed transactions,
wherein the reputation score is based on client feedback from one or more reviews associated with the non-fungible token, and
wherein the reputation score is decreased for a failed transaction;

appending the non-fungible token with the reputation score as a metadata tag;
invoking a reputation score validation smart contract with instructions to validate the reputation score;
checking to determine that the reputation score, appended as a part of the non-fungible token metadata tag, is valid; and
uploading, based on the checking, the non-fungible token and the metadata tag to an ID repository.

11. The computer program product of claim 10, the method further comprising:
creating an operation output that includes the metadata tag;
injecting the operation output into a block; and
recording the block to a blockchain ledger.

12. The computer program product of claim 10, wherein the receiving includes retrieving the reputation data from the ID repository, wherein the reputation data was appended to the ID repository by a second blockchain network.

13. The computer program product of claim 10, wherein the determining includes:
retrieving the one or more reputation rules from a reputation module engine, wherein the reputation rules dictate how the reputation data is used to determine the reputation score.

14. The computer program product of claim 10, wherein the reputation score is based on one or more reviews associated with the identity.

* * * * *